US012608721B2

(12) United States Patent
    Fombrun et al.

(10) Patent No.: US 12,608,721 B2
(45) Date of Patent: Apr. 21, 2026

(54) SYSTEM AND METHOD FOR DETERMINING AND MANAGING REPUTATION OF ENTITIES AND INDUSTRIES THROUGH USE OF BEHAVIORAL CONNECTIONS

(71) Applicant: RepTrak Holdings, Inc., Boston, MA (US)

(72) Inventors: Charles Fombrun, Fort Lauderdale, FL (US); Mark Haseltine, Wayland, MA (US); Anna Litvak-Hinenzon, Newton, MA (US); Cees van Riel, Breda (NL)

(73) Assignee: REPTRAK HOLDINGS, INC., Boston, MA (US)

( * ) Notice: Subject to any disclaimer, the term of this patent is extended or adjusted under 35 U.S.C. 154(b) by 0 days.

(21) Appl. No.: 17/812,762

(22) Filed: Jul. 15, 2022

(65) Prior Publication Data

US 2022/0366438 A1 Nov. 17, 2022

Related U.S. Application Data

(60) Division of application No. 17/306,397, filed on May 3, 2021, which is a continuation-in-part of application No. 17/176,271, filed on Feb. 16, 2021.

(51) Int. Cl.
    *G06Q 30/02* (2023.01)
    *G06Q 30/0202* (2023.01)
    *G06Q 30/0203* (2023.01)

(52) U.S. Cl.
    CPC ..... *G06Q 30/0202* (2013.01); *G06Q 30/0203* (2013.01)

(58) Field of Classification Search
    CPC ........... G06Q 30/0202; G06Q 30/0203; G06Q 30/0201; G06Q 30/0282; G06N 20/20
    See application file for complete search history.

(56) References Cited

U.S. PATENT DOCUMENTS 8,200,527 B1 * 6/2012 Thompson ............. G06Q 30/00
                                                    705/7.41
11,436,647 B1 9/2022 Null et al.
                (Continued)

FOREIGN PATENT DOCUMENTS

WO 2008092147 A2 7/2008

OTHER PUBLICATIONS

University of Chicago, What is a Survey? Fritz Scheuren (Year: 2004).*

(Continued)

*Primary Examiner* — Breffni X Baggot
(74) *Attorney, Agent, or Firm* — Nieves IP Law Group, LLC; Peter A. Nieves

(57) ABSTRACT

A system and method for determining and managing reputation of an entity or industry includes determining a sample size of the population that provides at least a pre-defined percent confidence interval, and which has the predefined level of familiarity (unique group); determining a measure of likelihood that the targeted population will perform a positive action on behalf of an entity (behavioral connection score), wherein determining the measure of the likelihood that the targeted population will perform a positive action on behalf of an entity comprises: receiving survey ratings from behavioral connection survey questions where each survey rating is provided by a party within the unique group; weighting the received survey ratings to accommodate for at least one of the group consisting of cultural bias and missed demographic quotas; and aggregating the ratings within each individual question to provide a single aggregated behavioral connection score for each behavioral connection survey question.

17 Claims, 10 Drawing Sheets

(56) References Cited

U.S. PATENT DOCUMENTS

| | | | |
|---|---|---|---|
| 2009/0055858 A1* | 2/2009 | Knoller | H04N 7/17318 |
| | | | 725/34 |
| 2012/0179752 A1 | 7/2012 | Mosley et al. | |
| 2012/0226743 A1* | 9/2012 | Smargon | G06Q 20/384 |
| | | | 709/203 |
| 2012/0296845 A1 | 11/2012 | Andrews et al. | |
| 2012/0323627 A1 | 12/2012 | Herring, Jr. et al. | |
| 2013/0103385 A1 | 4/2013 | Ghosh et al. | |
| 2013/0166374 A1 | 6/2013 | Capuozzo et al. | |
| 2013/0317808 A1* | 11/2013 | Kruel | H04L 51/52 |
| | | | 704/9 |
| 2014/0101247 A1 | 4/2014 | Pappas | |
| 2014/0193795 A1 | 7/2014 | Tavolacci et al. | |
| 2014/0358888 A1 | 12/2014 | Whitelaw et al. | |
| 2015/0046359 A1 | 2/2015 | Marotti et al. | |
| 2017/0091810 A1* | 3/2017 | McGovern | G06Q 30/0247 |
| 2017/0249389 A1* | 8/2017 | Brovinsky | G06F 16/9536 |
| 2018/0182038 A1 | 6/2018 | Di Sciullo et al. | |
| 2019/0286676 A1* | 9/2019 | Fatzinger | G06F 40/56 |
| 2020/0074294 A1* | 3/2020 | Long | G06N 3/044 |

OTHER PUBLICATIONS

Bao, Lingfeng, et al. "Who will leave the company ?: a large-scale industry study of developer turnover by mining monthly work report." 2017 IEEE/ACM 14th International Conference on Mining Software Repositories (MSR). IEEE, 2017.
Curran, Paul G. "Methods for the detection of carelessly invalid responses in survey data." Journal of Experimental Social Psychology 66 (2016): 4-19 2016.
Hira, Zena M., and Duncan F. Gillies. "A review of feature selection and feature extraction methods applied on microarray data." Advances in bioinformatics 2015 (2015) 2015.
RepTrak-2014 Slide 1 (khuatquanghung.com) 2014.
Mark Shanley, et al., "What's in a name? Reputation Building and Corporate Strategy" published in Academy of Mgmt Journal vol. 33 No. 2 (1990) 1990.
Langley, "Approaches to Machine Learning" Carnegie-Mellon University 1984.
https://www.reptrak.com/blog/7-ways-to-quantify-reputation/ (Jun. 10, 2019) 2019.

Geron, "Hands-on Machine Learning with SciKit-Learn, Keras &TensorFlow" (1990).
Rantanen, "Classifying Online Corporate Reputation with Machine Learning a study in the Banking Domain" 2018.
Reputation Book 2018 20th Anniversary Reprint by Fomburn 2018.
"Winning in the Reputation Economy" powerpoint 2019.
https://www.rankingthebrands .com/PDF/CSR %20Global% 20RepTrak%202015, %20Reputation %20Institute.pdf 2015.
https://www.rankingthebrands .com/PDF/Global%20CR %20RepTrak% 20100%202018,%20Reputation %20Institute.pdf 2018.
https ://www.geopoll.com/blog/weighting-survey-data-raking-cell-weighting/ (Year: 2019).
https://www.reptrak.com/blog/what-is-the-reputation-economy/ 2019.
Extended European Search Report for EP22157105.2, dated Jun. 24, 2022.
Extended European Search Report for EP22157071.6, dated Jun. 27, 2022.
Extended European Search Report for EP22157068.2, dated Jun. 22, 2022.
Extended European Search Report for EP22157116.9, dated Jun. 28, 2022.
Wepener, The development of a new instrument to measure client-based corporate reputation in the service industry Dec. 2014.
Extended European Search Report for EP22157071.6, dated Jun. 6, 2025.
Extended European Search Report for EP22157105.2, dated Jun. 5, 2025.
Kock, Ned, and Gary Lynn. "Lateral collinearity and misleading results in variance-based SEM: An illustration and recommendations." Journal of the Association for information Systems 13. 7 (2012). (Year: 2012).
Reputation Benchmarks—Insights from Reputation Institute (wordpress. com) (Year: 2018).
Roesch, Andreas, Serenella Sala, and Niels Jungbluth. "Normalization and weighting: the open challenge in LCA." The International Journal of Life Cycle Assessment 25.9 (2020): 1859-1865. (Year: 2020).
Tedeschi, Antonio, and Francesco Benedetto. "A cloud-based tool for brand monitoring in social networks." 2014 International Conference on Future Internet of Things and Cloud. IEEE, 2014. (Year: 2014).
Wiley Encyclopedia of Computer Science and Engineering (2009) (Year: 2009).

* cited by examiner

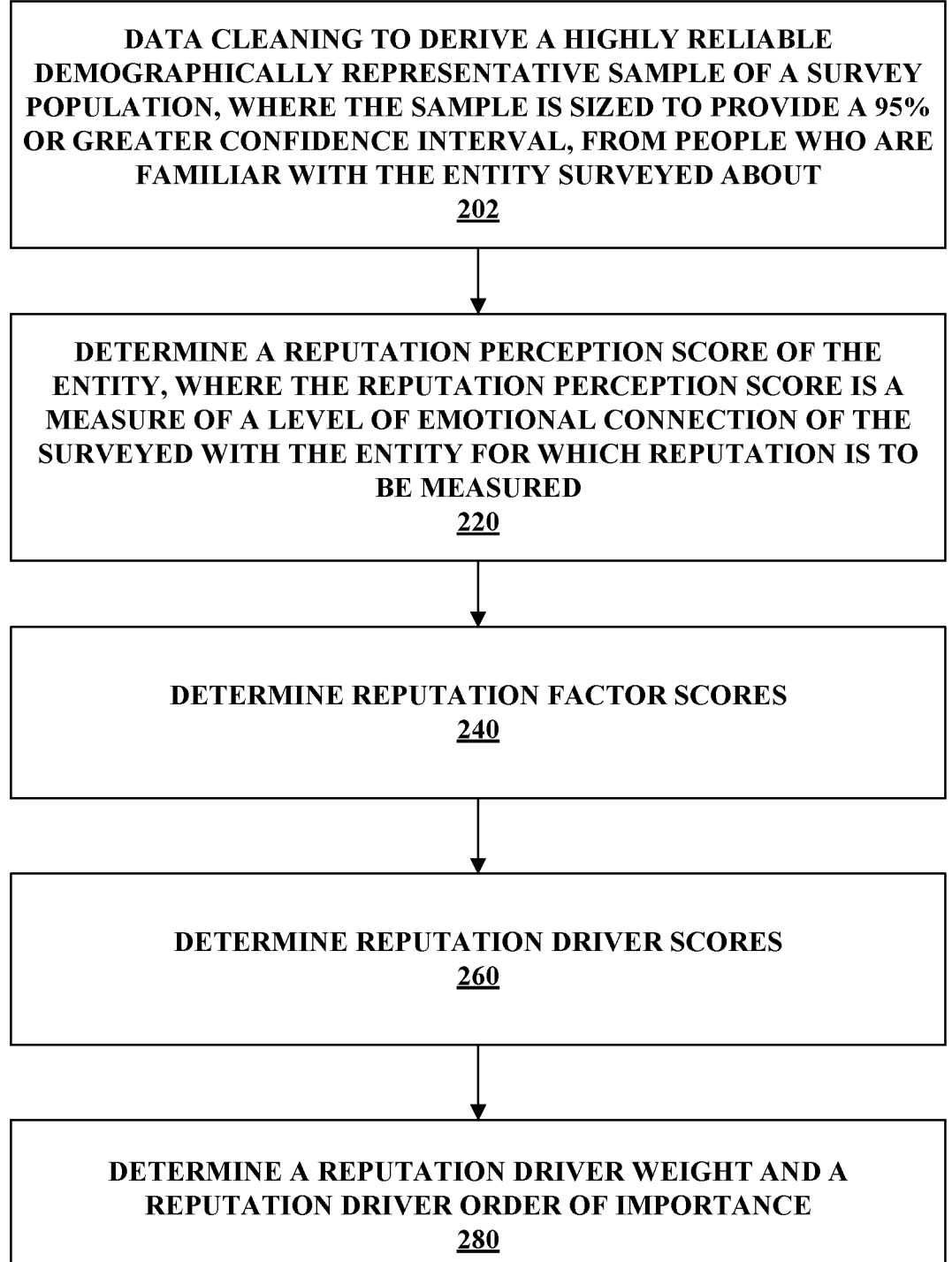

DATA CLEANING TO DERIVE A HIGHLY RELIABLE DEMOGRAPHICALLY REPRESENTATIVE SAMPLE OF A SURVEY POPULATION, WHERE THE SAMPLE IS SIZED TO PROVIDE A 95% OR GREATER CONFIDENCE INTERVAL, FROM PEOPLE WHO ARE FAMILIAR WITH THE ENTITY SURVEYED ABOUT
202

DETERMINE A REPUTATION PERCEPTION SCORE OF THE ENTITY, WHERE THE REPUTATION PERCEPTION SCORE IS A MEASURE OF A LEVEL OF EMOTIONAL CONNECTION OF THE SURVEYED WITH THE ENTITY FOR WHICH REPUTATION IS TO BE MEASURED
220

DETERMINE REPUTATION FACTOR SCORES
240

DETERMINE REPUTATION DRIVER SCORES
260

DETERMINE A REPUTATION DRIVER WEIGHT AND A REPUTATION DRIVER ORDER OF IMPORTANCE
280

FIG. 4

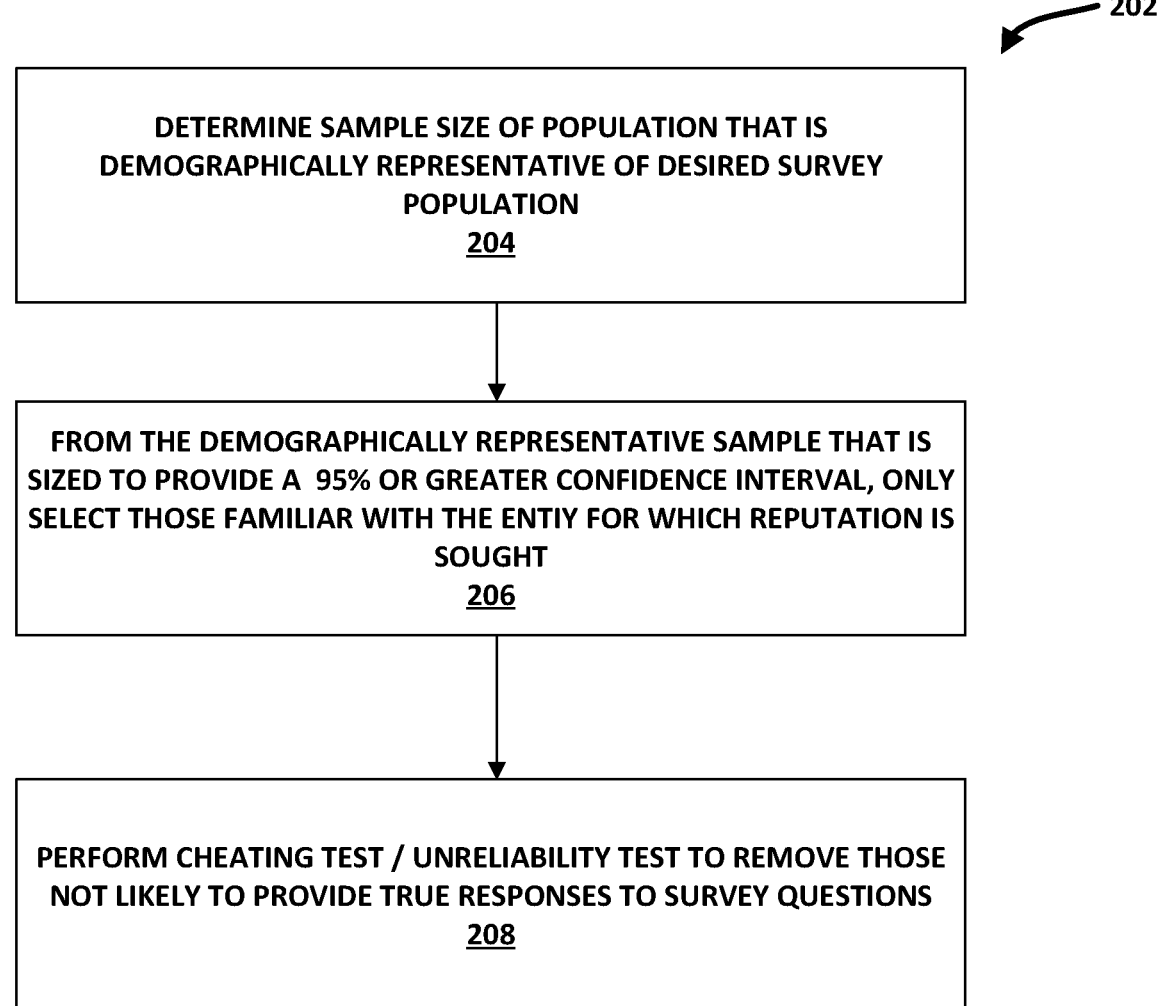

202

DETERMINE SAMPLE SIZE OF POPULATION THAT IS
DEMOGRAPHICALLY REPRESENTATIVE OF DESIRED SURVEY
POPULATION
204

FROM THE DEMOGRAPHICALLY REPRESENTATIVE SAMPLE THAT IS
SIZED TO PROVIDE A  95% OR GREATER CONFIDENCE INTERVAL, ONLY
SELECT THOSE FAMILIAR WITH THE ENTIY FOR WHICH REPUTATION IS
SOUGHT
206

PERFORM CHEATING TEST / UNRELIABILITY TEST TO REMOVE THOSE
NOT LIKELY TO PROVIDE TRUE RESPONSES TO SURVEY QUESTIONS
208

FIG. 5

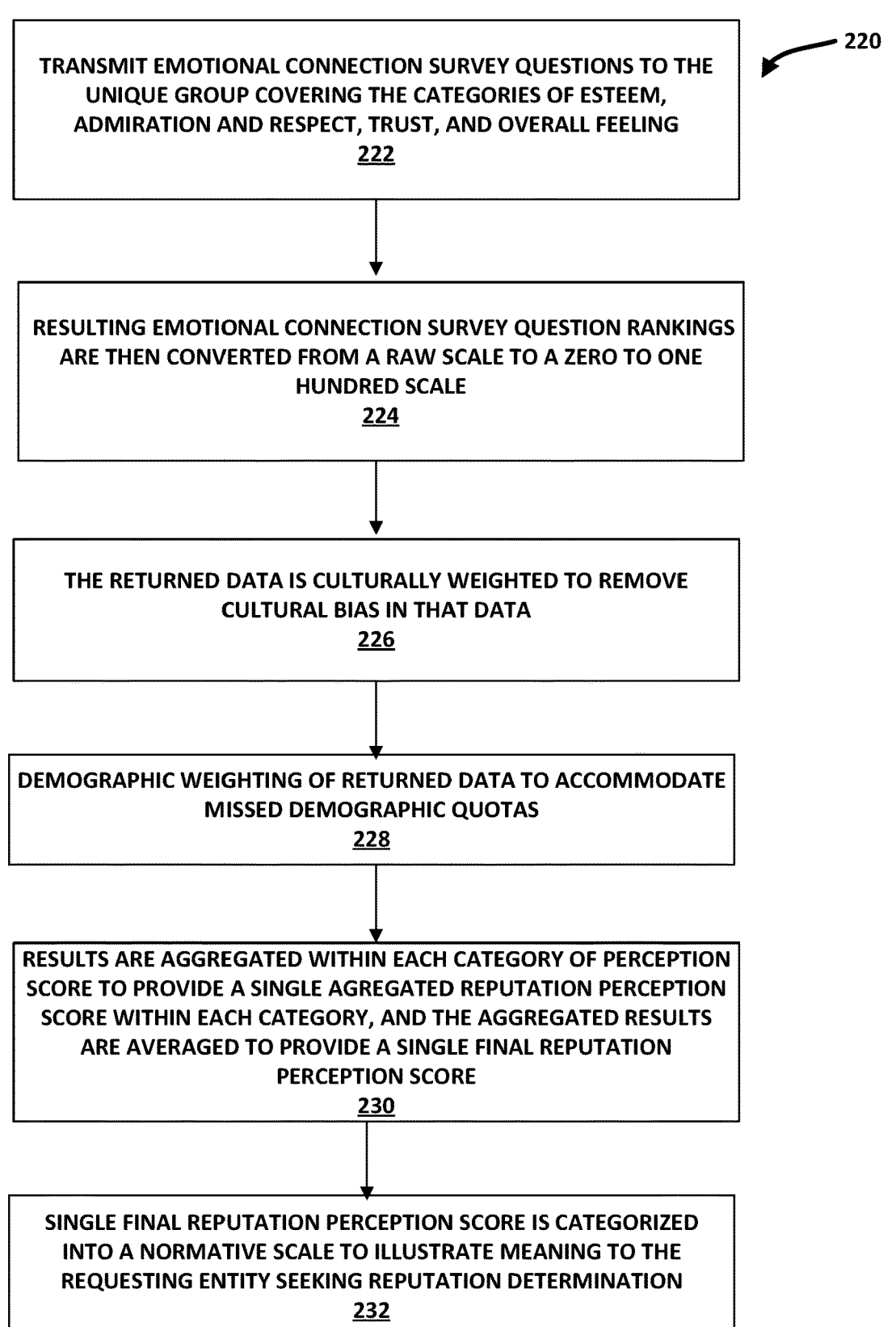

220

TRANSMIT EMOTIONAL CONNECTION SURVEY QUESTIONS TO THE UNIQUE GROUP COVERING THE CATEGORIES OF ESTEEM, ADMIRATION AND RESPECT, TRUST, AND OVERALL FEELING
222

RESULTING EMOTIONAL CONNECTION SURVEY QUESTION RANKINGS ARE THEN CONVERTED FROM A RAW SCALE TO A ZERO TO ONE HUNDRED SCALE
224

THE RETURNED DATA IS CULTURALLY WEIGHTED TO REMOVE CULTURAL BIAS IN THAT DATA
226

DEMOGRAPHIC WEIGHTING OF RETURNED DATA TO ACCOMMODATE MISSED DEMOGRAPHIC QUOTAS
228

RESULTS ARE AGGREGATED WITHIN EACH CATEGORY OF PERCEPTION SCORE TO PROVIDE A SINGLE AGREGATED REPUTATION PERCEPTION SCORE WITHIN EACH CATEGORY, AND THE AGGREGATED RESULTS ARE AVERAGED TO PROVIDE A SINGLE FINAL REPUTATION PERCEPTION SCORE
230

SINGLE FINAL REPUTATION PERCEPTION SCORE IS CATEGORIZED INTO A NORMATIVE SCALE TO ILLUSTRATE MEANING TO THE REQUESTING ENTITY SEEKING REPUTATION DETERMINATION
232

FIG. 6

REDUNDANCY ANALYSIS IS FIRST RUN ON THE FACTORS TO REMOVE
REDUNDANT FACTORS AND REMOVE COLLINEARITY IN THE DATA
<u>264</u>

UNSUPERVISED LEARNING CLUSTERING IS PERFORMED TO
DETERMINE TO WHICH OF THE DRIVERS EACH FACTOR BELONGS
<u>266</u>

TAKE THE SCORE FOR EACH FACTOR WITHIN A DRIVER AND AVERAGE
THEM TO DERIVE THE REPUTATION DRIVER SCORE FOR EACH DRIVER
<u>268</u>

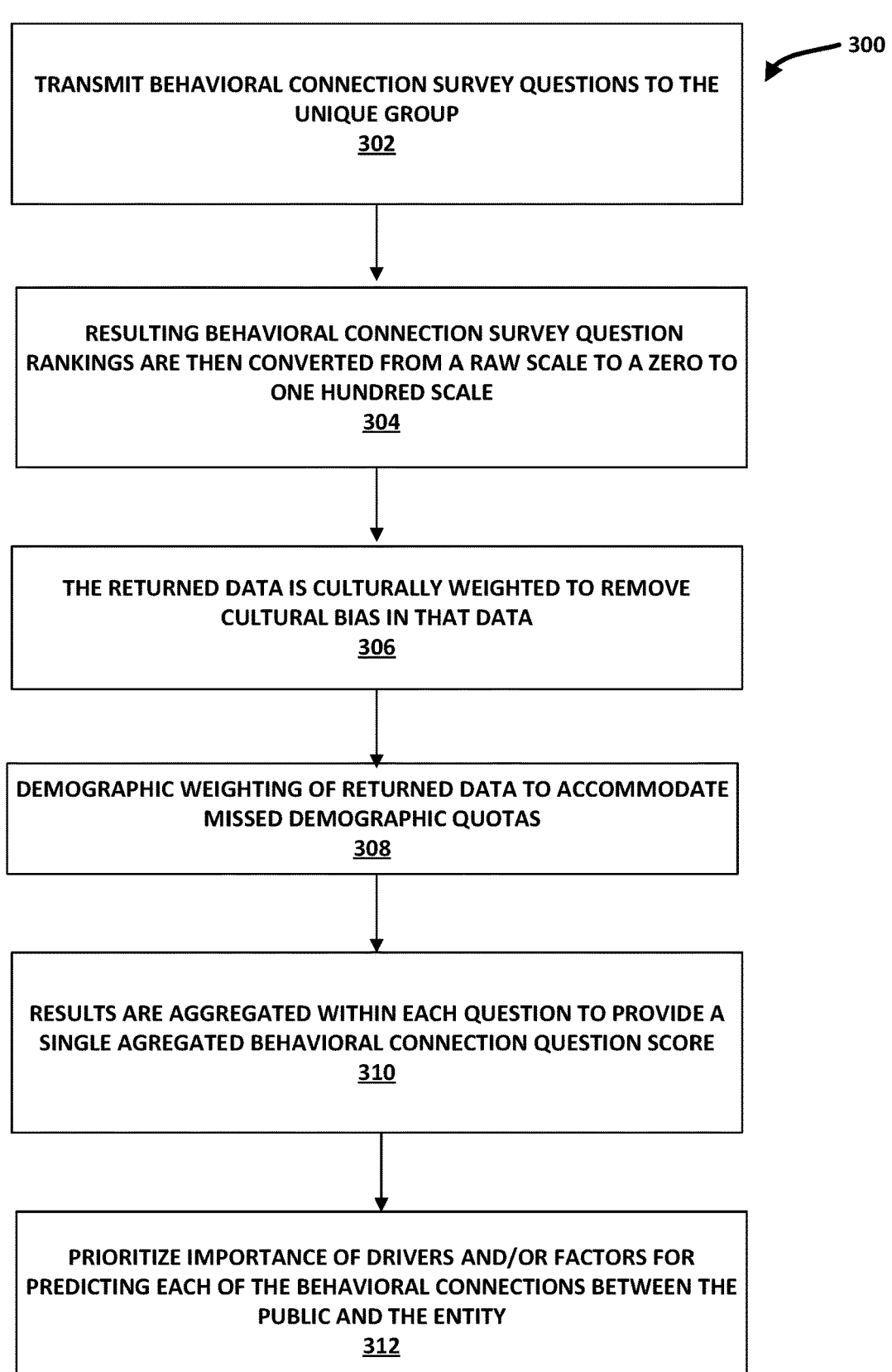

300

TRANSMIT BEHAVIORAL CONNECTION SURVEY QUESTIONS TO THE
UNIQUE GROUP
302

RESULTING BEHAVIORAL CONNECTION SURVEY QUESTION
RANKINGS ARE THEN CONVERTED FROM A RAW SCALE TO A ZERO TO
ONE HUNDRED SCALE
304

THE RETURNED DATA IS CULTURALLY WEIGHTED TO REMOVE
CULTURAL BIAS IN THAT DATA
306

DEMOGRAPHIC WEIGHTING OF RETURNED DATA TO ACCOMMODATE
MISSED DEMOGRAPHIC QUOTAS
308

RESULTS ARE AGGREGATED WITHIN EACH QUESTION TO PROVIDE A
SINGLE AGREGATED BEHAVIORAL CONNECTION QUESTION SCORE
310

PRIORITIZE IMPORTANCE OF DRIVERS AND/OR FACTORS FOR
PREDICTING EACH OF THE BEHAVIORAL CONNECTIONS BETWEEN THE
PUBLIC AND THE ENTITY
312

FIG. 9

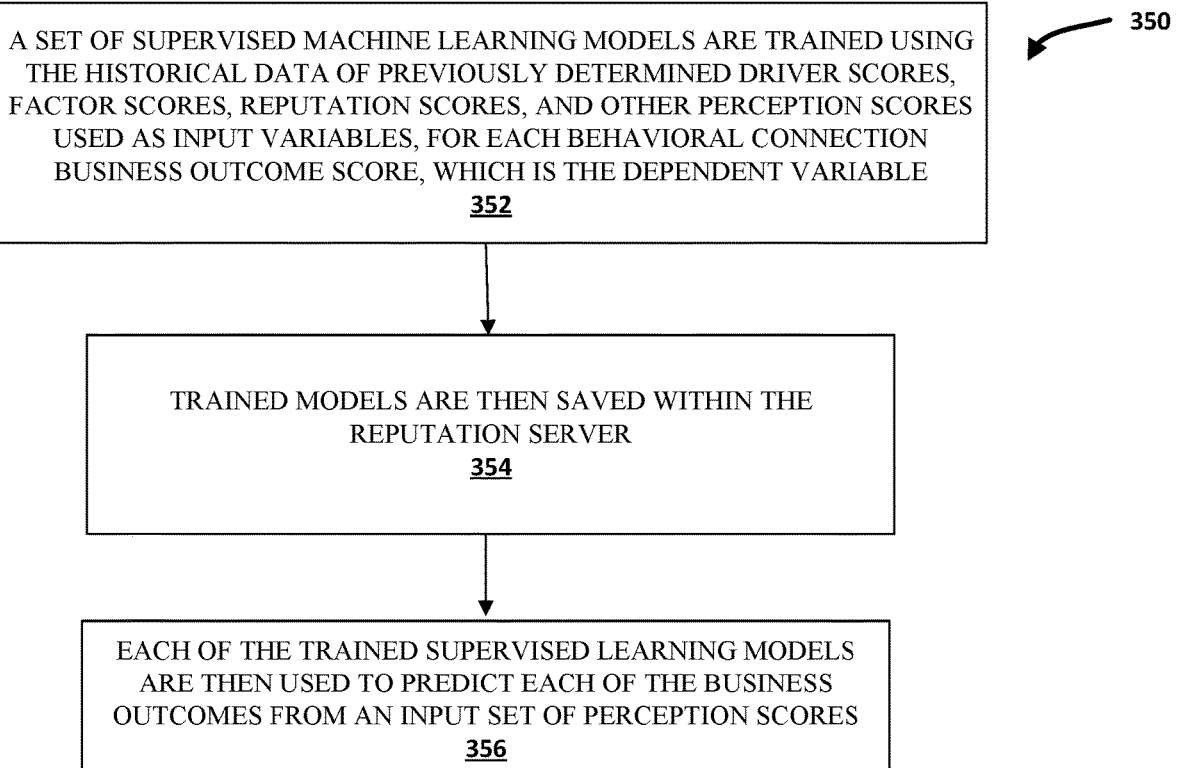

A SET OF SUPERVISED MACHINE LEARNING MODELS ARE TRAINED USING THE HISTORICAL DATA OF PREVIOUSLY DETERMINED DRIVER SCORES, FACTOR SCORES, REPUTATION SCORES, AND OTHER PERCEPTION SCORES USED AS INPUT VARIABLES, FOR EACH BEHAVIORAL CONNECTION BUSINESS OUTCOME SCORE, WHICH IS THE DEPENDENT VARIABLE
352

TRAINED MODELS ARE THEN SAVED WITHIN THE REPUTATION SERVER
354

EACH OF THE TRAINED SUPERVISED LEARNING MODELS ARE THEN USED TO PREDICT EACH OF THE BUSINESS OUTCOMES FROM AN INPUT SET OF PERCEPTION SCORES
356

SYSTEM AND METHOD FOR DETERMINING AND MANAGING REPUTATION OF ENTITIES AND INDUSTRIES THROUGH USE OF BEHAVIORAL CONNECTIONS

CROSS-REFERENCE TO RELATED APPLICATIONS

This application is a divisional of U.S. patent application Ser. No. 17/306,397, filed May 3, 2021, entitled System and Method for Determining and Managing Reputation of Entities and Industries Through Use of Behavioral Connections, which is a continuation-in-part of U.S. patent application Ser. No. 17/176,271, filed Feb. 16, 2021, entitled "System and Method For Determining And Managing Reputation Of Entities And Industries," both of which are incorporated by reference herein in their entirety.

FIELD OF THE INVENTION

The present invention generally relates to effective determination of entity and industry reputations, and, more particularly, to systems and methods that provide realistic and accurate determination of the ability of an entity to deliver on stakeholder expectations through a measure of the likelihood that a targeted population will perform a positive action on behalf of the entity.

BACKGROUND OF THE INVENTION

It is vital for companies, brands, and corporations to manage their reputation. The reputation of a corporation is a measure of how society views the corporation and provides a good measure of public expectation that the corporation has the basic ability to fulfill the expectations of a current or potential consumer. Reputation of a corporation bears weight on a number of important factors. For example, a strong reputation of a corporation will increase chances of obtaining and maintaining a loyal customer base, resulting in increased sales and being able to charge a premium for items sold. Strong corporate reputation also allows for a stronger current and potential employee pool. A strong reputation also increases chances that a potential purchaser will commit to a purchase, and a potential investor will commit to an investment.

Reputation is especially important in e-commerce, where products are being purchased online and the benefit of face to face encounter and interaction is uncommon. In addition, the e-commerce world removes the personal brick and mortar experience, making interaction during purchasing less personal, thereby making reputation even more important since live interaction cannot be relied upon to entice current and potential customers.

Reputation determination currently is inaccurately measured, using unrealizable data that tends to be biased and self-serving. A more reliable system and method is required to be provided for accurately measuring and managing reputation of entities and industries so as to allow for adjustment to improve reputation, thereby benefitting the entity, as well as enhancing consumer experience.

SUMMARY OF THE INVENTION

Embodiments of the present invention provide a system and method for determining and managing entity or industry reputation. Briefly described, the method includes determining a sample size of population that is demographically representative of a desired survey population and which provides at least a pre-defined percent confidence interval, where those within the sample size have a predefined level of familiarity with the entity, and wherein this sample size which provides at least a pre-defined percent confidence interval, and which has the predefined level of familiarity, is referred to herein as a unique group; determining a measure of the likelihood that the targeted population will perform a positive action on behalf of an entity, referred to as a behavioral connection score, wherein determining the measure of the likelihood that the targeted population will perform a positive action on behalf of an entity comprises the steps of: receiving survey ratings from behavioral connection survey questions where each survey rating is provided by a party within the unique group; weighting the received survey ratings to accommodate for at least one of the group consisting of cultural bias and missed demographic quotas; and aggregating the converted and weighted received ratings within each individual question to provide a single aggregated behavioral connection score for each behavioral connection survey question.

In accordance with a further exemplary embodiment of the invention, a method for predicting a measure of likelihood that a targeted population will perform a positive action on behalf of an entity, referred to as a behavioral connection score, is provided, comprising the steps of: training a set of one or more supervised machine learning models using historical data of previously determined driver scores, factor scores, and reputation scores, used as input variables, wherein each behavioral connection business outcome score is a dependent variable, where a reputation score is a level of emotional connection of those within a unique group with the entity, a factor score is a level of how those within the unique group practically think about the entity, and a driver score is a score of an area that members of the unique group would tend to care about when assessing the reputation of the entity; storing the trained set of supervised machine learning models; and predicting at least one of the business outcomes from the reputation scores, driver scores, and factor scores, through use of at least one of the trained supervised learning models.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principals of the invention.

FIG. 4 is a flowchart exemplifying steps taken in accordance with the present system and method to determining and managing reputations of entities and industries.

FIG. 5 is a flowchart further illustrating steps taken in obtaining the data and cleaning the data.

FIG. 6 is a flowchart further illustrating steps taken in obtaining a reputation perception score.

FIG. 9 is a flowchart illustrating steps taken in deriving the behavioral connection score associated with the entity for which reputation is to be measured.

FIG. 10 is a flowchart further illustrating steps taken by the behavioral connection module in predicting the behavioral connection scores from the combinations of scores.

DETAILED DESCRIPTION

The present system and method provides a reliable measure of reputation for an entity or industry, and allows for reputation management in a manner that is most efficient, where specific adjustments that would be most effective toward increasing reputation are highlighted so as to provide the entity or industry with guidance for improving reputation. It should be noted that an entity may be any of, but not limited to, a corporation, company, individual, or a group of individuals functioning under one name or label.

Figure 1:
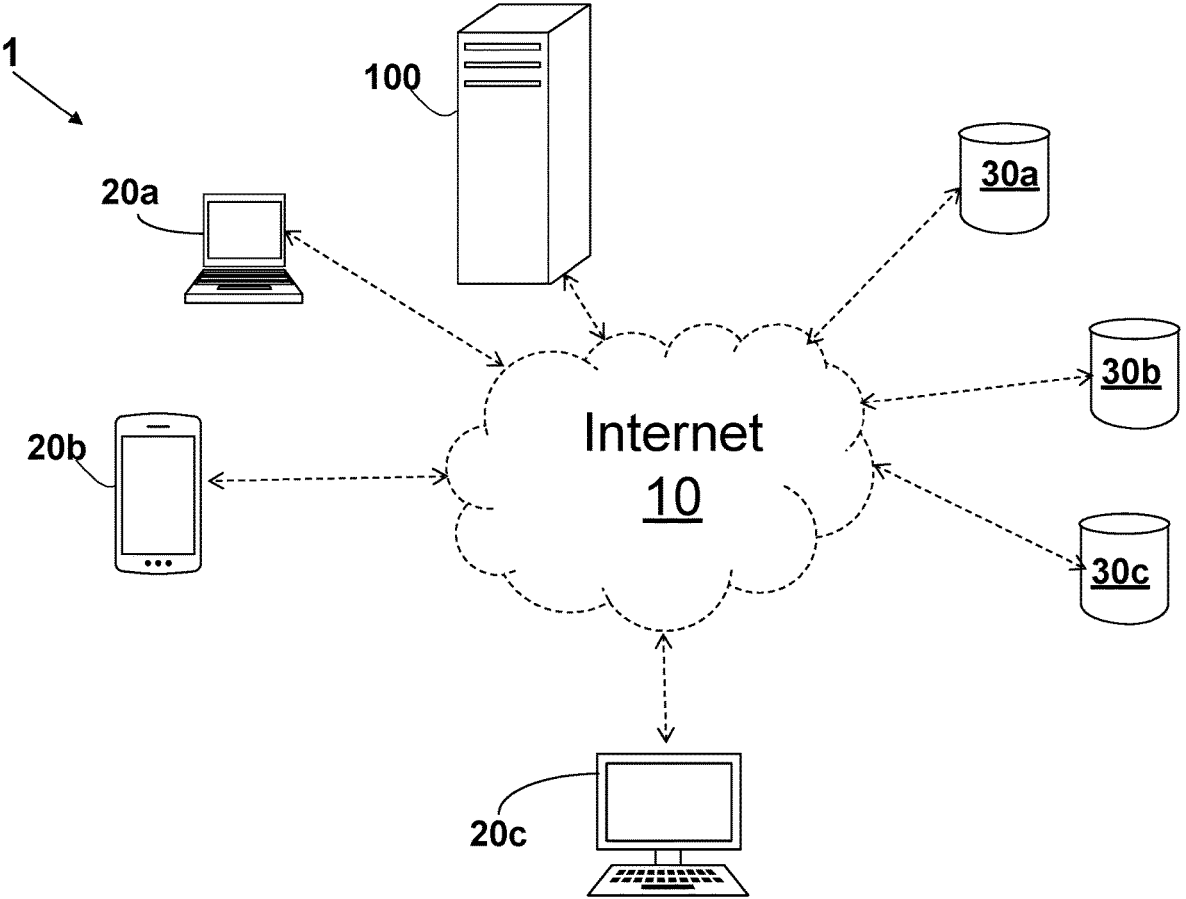
FIG. 1 is a schematic illustration of a network in which the present system and method may be provided.

The present system and method may be provided in the network 1 illustrated by the schematic diagram of FIG. 1. A reputation server 100 may contain a reputation engine therein, for defining functionality performed by the present reputation determining and managing system and method, as will be described in detail herein. A consumer interacting with the present system and method can communicate with the reputation server 100 via the internet through use of a user device such as, but not limited to a laptop 20*a*, a cell phone 20*b*, or a desktop computer 20*c*. Such devices 20*a*-20*c* allow a user to interact with the reputation server 100 through use of a graphical user interface or other method that will allow a user to sign into the reputation server 100, enter necessary information and retrieve requested information, such as a reputation score, driver scores, and weights of driver scores, through, for example, a web site, or directly through interaction with a software application stored on the user device 20*a*-20*c*, or by other means. Information retrieved from and provided to the reputation server 100 will be described in additional detail herein. It should be noted that the user device 20 may be a different device, such as, but not limited to, an i-pad, smart watch, or other device.

As shown by FIG. 1, one or more database 30*a*-30*c* may be provided for storing data from and/or providing data to the reputation server 100, as described herein. While three databases are illustrated by FIG. 1, one having ordinary skill in the art will appreciate that fewer or more databases may be provided. It will also be appreciated that such remote storage may be cloud storage or another form of remote storage.

Functionality as performed by the present reputation assessment and management system and method is defined by modules within the reputation server 100. The modules may be provided together as a reputation engine consisting of the modules, or in multiple locations within a single or more than one machine. For example, in hardware, the functionality of the modules can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. The modules can also be provided as software modules of a reputation engine, where the reputation engine comprises a processor and a memory having software modules therein defining functionality to be performed by the present system and method.

Figure 2:
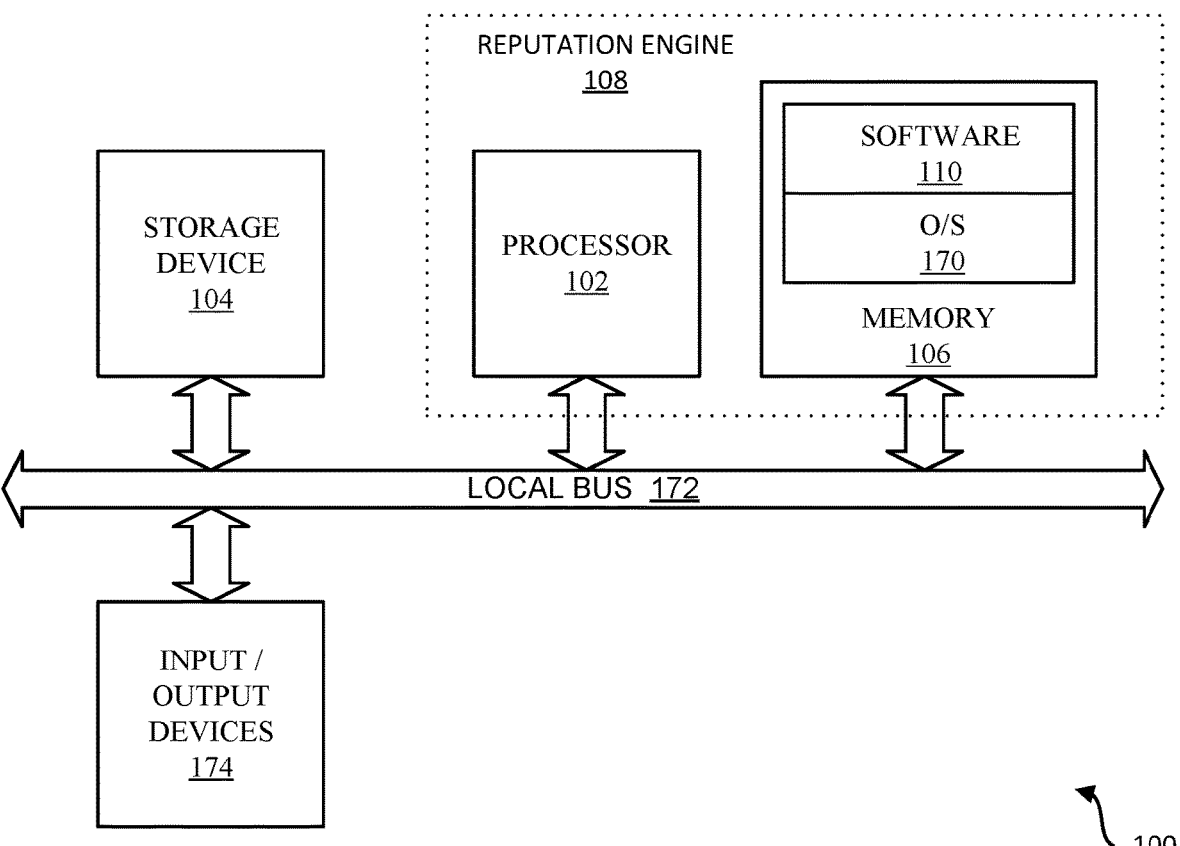
FIG. 2 is a schematic diagram further illustrating the reputation server of FIG. 1 in accordance with one exemplary embodiment of the invention.

Referring to an embodiment where the reputation engine comprises a memory having software modules therein defining functionality to be performed by the present system and method, as shown by FIG. 2, the reputation server 100 contains a processor 102, a local storage device 104, a memory 106 having software 110 stored therein that defines the reputation engine functionality, input and output (I/O) devices 174 (or peripherals), and a local bus, or local interface 172 allowing for communication within the reputation server 100. The combination of the processor 102 and the memory 106 may also be referred to as the reputation engine 108. The local interface 172 can be, for example but not limited to, one or more buses or other wired or wireless connections, as is known in the art. The local interface 172 may have additional elements, which are omitted for simplicity, such as controllers, buffers (caches), drivers, repeaters, and receivers, to enable communications. Further, the local interface 172 may include address, control, and/or data connections to enable appropriate communications among the aforementioned components.

The processor 102 is a hardware device for executing software, particularly that stored in the memory 106. The processor 102 can be any custom made or commercially available single core or multi-core processor, a central processing unit (CPU), a Graphics processing unit (GPU), an auxiliary processor among several processors associated with the present reputation server 100, a semiconductor-based microprocessor (in the form of a microchip or chip set), a microprocessor, or generally any device for executing software instructions.

The memory 106 can include any one or combination of volatile memory elements (e.g., random access memory (RAM, such as DRAM, SRAM, SDRAM, etc.) and non-volatile memory elements (e.g., ROM, hard drive, tape, CDROM, etc.). Moreover, the memory 106 may incorporate electronic, magnetic, optical, and/or other types of storage media. Note that the memory 106 can have a distributed architecture, where various components are situated remotely from one another, but can be accessed by the processor 102.

The software 110 defines functionality performed by the reputation 100, in accordance with the present invention. The software 110 in the memory 106 may include one or more separate programs, each of which contains an ordered listing of executable instructions for implementing logical functions of the reputation server 100, as described below. The memory 106 may contain an operating system (O/S) 170. The operating system 170 essentially controls the execution of programs within the reputation server 100 and provides scheduling, input-output control, file and data management, memory management, and communication control and related services.

The I/O devices 174 may include input devices, for example but not limited to, a keyboard, mouse, scanner, microphone, etc. Furthermore, the I/O devices 174 may also include output devices, for example but not limited to, a printer, display, etc. Finally, the I/O devices 174 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the reputation server 100 is in operation, the processor 102 is configured to execute the software 110 stored within the memory 106, to communicate data to and from the memory 106, and to generally control operations of the reputation server 100 pursuant to the software 110.

When the functionality of the reputation server 100 is in operation, the processor 102 is configured to execute the software 110 stored within the memory 106, to communicate data to and from the memory 106, and to generally control operations of the reputation server 100 pursuant to the software 110. The operating system 170 is read by the processor 102, perhaps buffered within the processor 102, and then executed.

When functionality of the reputation server 100 is implemented in software 110, as defined by software modules within the memory 106, as will be described herein, it should be noted that instructions for implementing the reputation server 100 can be stored on any computer-readable medium for use by or in connection with any computer-related device, system, or method. Such a computer-readable medium may, in some embodiments, correspond to either or both the memory 106 or the storage device 104. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 102 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 3:
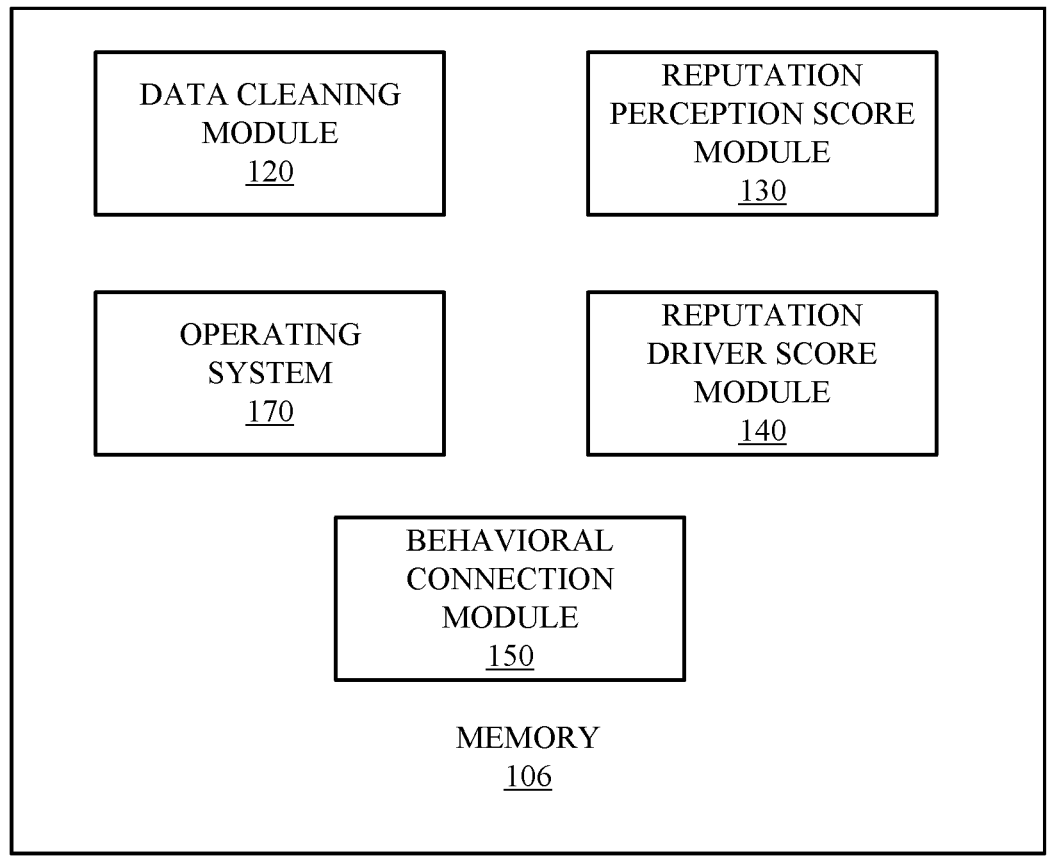
FIG. 3 is a schematic diagram further illustrating modules within the memory of FIG. 2 that are used to perform functionality of the reputation server in accordance with the present invention.

FIG. 3 is a schematic diagram further illustrating modules within the memory 106 of FIG. 2 that are used to perform functionality of the reputation server 100 in accordance with the present invention. As shown by FIG. 3, the reputation server 100 contains a data cleaning module 120, a reputation perception score module 130, a reputation driver score module 140, and a behavioral connection module 150. These modules work together to provide reputation determination and management as is to be described herein.

FIG. 4 is a flowchart exemplifying steps taken in accordance with the present system and method in determining and managing reputations of entities and industries. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As shown by block 202, data is obtained for determining reputation of an entity and that data is cleaned. FIG. 5 is a flowchart further illustrating steps taken in obtaining the data and cleaning the data. Referring to FIG. 5, the present method begins with the gathering of survey data from an informed general public in a unique manner. Specifically, as shown by block 204 a sample size of individuals necessary for the survey is determined. The sample size of the population that is to be used is to be demographically representative of a desired size of the population for which the survey is sought. For example, if the population to be surveyed comprises forty percent males and sixty percent females, as well as twenty percent aged between fifteen and twenty-one, thirty percent aged between twenty-two and thirty-five, and fifty percent aged between thirty-six and fifty, the sample size for surveying would have the same or extremely close to these percentages so as to have a demographically representative sample group. The size, or number, of individuals surveyed is determined using a known statistical formula, resulting in obtaining a ninety-five percent or better confidence interval. This means that the difference between the survey results of the populations sought, and the survey results of the demographically representative smaller sized survey group is a maximum of around five percent. One having ordinary skill in the art would appreciate that a lower confidence interval may be used, however, it has been determined that a ninety-five percent or better confidence interval is ideal to provide the data beneficial to obtaining highly accurate reputation determination and management. The result of this step is a demographically representative sample that is sized to provide a ninety-five percent or better confidence interval.

As shown by block 206, a determination is then made to ensure that those to be surveyed have a predefined level of familiarity with the entity for which reputation determination is sought. Reputation determination is more accurate when only those with at least the predefined level of familiarity with the entity itself are surveyed. Only respondents that pass a pre-defined threshold of familiarity are considered in the rating. For example, familiarity can be assessed on a scale of one to seven, and only those familiar at level of four and up are considered. From the familiarity score, the present system and method can also provide the entity with an awareness score for their reference and reputation management. The level of familiarity of those to be surveyed may be determined by asking questions that are specific to the entity for which the reputation determination is sought.

Since a surveyed person could potentially lie about their level of familiarity with an entity, a screening for unreliability test, is performed to flush out those likely to lie or exaggerate about their familiarity with an entity associated with the survey questions (block 208). For example, a questionnaire can be sent that lists corporations that do not exist and requesting a familiarity level from the receiver of the survey. If the individual surveyed claims to be familiar with one or more corporation that does not exist, the responder may be considered to be unreliable and they would then be removed from the demographically representative sample that is sized to provide a ninety-five or greater confidence interval.

The previously mentioned data cleaning steps of FIG. 5 result in a highly reliable demographically representative sample of a survey population that is sized to provide a ninety-five percent or greater confidence interval, from people who are familiar with the surveyed entity. It should be noted that while the present description is provided with regard to determining a highly accurate reputation of an entity, this process that is being described herein may instead by applied for a specific product, brand, or even an industry.

Returning to FIG. 4, after performing the data cleaning step (block 202), the reputation server 100 determines a reputation perception score (block 220). The reputation perception score is a measure of a level of emotional connection of a stakeholder, such as the general public, to be surveyed with the entity for which reputation is to be measured. FIG. 6 is a flowchart further illustrating steps taken in obtaining a reputation perception score.

Referring to FIG. 6, a series of focused, emotional connection survey questions are transmitted to the unique group resulting from the sample determination in the data cleaning step (hereafter, referred to as the "unique group"). The transmitted survey questions measure a level of emotional connection of the unique group with the entity for which reputation is being measured (block 222). It is to be recalled that the unique group is the result of the data cleaning step, so that emotional connection survey answers from the unique group are extremely similar to what would be returned by an entire desired population. More specifically, if a unique group is two thousand individuals, survey results from that unique group would be extremely similar, if not the same as that which would have been received if an entire population of one million people for which the survey was intended, were in fact surveyed.

In accordance with the present invention, the emotional connection survey questions transmitted fall into one of four categories. A first category of survey questions is esteem questions, which are questions intended to determine a level of esteem that the party surveyed associates with the entity to which a reputation measurement is desired. As an example, the survey question may ask a surveyed individual to rate from one to seven whether a company is a company that the surveyed individual gets a good feeling about, with a seven rating representing that a very good feeling is felt by the surveyed individual, and a one ratings representing that a very poor feeling is felt by the surveyed individual.

A second category of survey questions is admiration questions, which are questions intended to determine a level of admiration that the party surveyed associates with the entity to which a reputation measurement is desired. As an example, the survey question may ask a surveyed individual to rate from one to seven whether a company is a company that the surveyed individual admires and respects, with a seven rating being a high level of admiration and respect, and a one rating being a lowest level of admiration and respect.

A third category of survey questions is trust questions, which are questions intended to determine a level of trust that the party surveyed associates with the entity to which a reputation measurement is desired. As an example, the survey question may ask a surveyed individual to rate from one to seven whether a company is a company that the surveyed individual trusts, with a seven rating being a high level of trust, and a one being the lowest level of trust.

A fourth category of survey questions is feeling questions, which are questions intended to determine a level of positive feeling that the party surveyed associates with the entity to which a reputation measurement is desired. As an example, the survey question may ask a surveyed individual to rate from one to seven whether a company is a company that the surveyed individual feels has a good overall reputation, with a seven rating signifying a belief that the company has a very good overall reputation, and a one rating signifying a belief that the company has a very poor overall reputation.

While it is preferred that rating for each category of emotional connection survey be between one and seven, one having ordinary skill in the art would appreciate that a different scale may be used that is smaller than a zero to one-hundred scale. This will be apparent in the following description since a conversion is performed to change from a smaller scale to a zero to one-hundred scale, as described herein.

The result of this step is X number of returned first, second, third, and fourth category survey questions, where X is the number of individuals within the unique group. Therefore, if there are, for example, two-thousand individuals within the unique group (the highly reliable demographically representative sample of a survey population that is sized to provide a ninety-five percent or greater confidence interval, from people who are familiar with the surveyed entity), then assuming that all who received the emotional connection survey questions responded with ratings, there will be two-thousand first category question ratings, two-thousand second category question ratings, two-thousand third category question ratings, and two-thousand fourth category question ratings, also referred to herein as the resulting emotional connection survey question ratings. The resulting emotional connection survey question ratings may be stored within the reputation server 100 storage device 104, or within one of the other databases 30*a*, 30*b*, 30*c* within the network 1.

As shown by block 224, each of the resulting emotional connection survey question ratings returned are then converted by the reputation engine 108 from a raw scale of one to seven, to a zero to one hundred scale, to provide a rescaled score for each of the resulting emotional connection survey question ratings returned. This process may be performed by the reputation perception score module 130 using an equation such as, but not limited to the following equation 1.

$$\text{Rescaled Score} = ((\text{Raw Score} - 1)/6) \times 100 \qquad \text{(Eq. 1)}$$

The result of this step is X number of esteem reputation perception scores, X number of admiration reputation perception scores, X number of trust reputation perception scores, and X number of feeling reputation perception scores, where X is the number of individuals within the unique group. Each of the reputation perception scores may then be stored within the reputation server 100 storage device 104, or within one of the other databases 30*a*, 30*b*, 30*c* within the network 1.

It has been determined that people in different countries, or geographical regions in general, tend to rate companies higher or lower resulting in an artificial skew in the rating distribution. As a result, and to ensure high accuracy in the final determined reputation of the reputation server 100, the present system and method overcomes this "cultural bias" in the data by standardizing all scores, per respondent, against the aggregate distribution of all scores stored (block 226). A standardization formula is applied in each market to ensure that scores are comparable across different markets, where different weights are applied to specific data based on the specific market. It should be noted that a "market" may be considered a specific geographical region, for example, a country, or a bigger or smaller geographical region. As an example, in Italy, the car brand Ferrari is likely to have an artificially high skew because the car is made in Italy. This would make survey results from those in Italy skewed on the high side. Therefore, the present system and method applies a standardization formula that takes into account a global mean and a global standard deviation across markets, and a country mean and a country standard deviation to normalize that which may have been skewed merely as a product of cultural pride or bias in general. As a result, a lower weight would be applied in Italy for the brand Ferrari than in other markets. Another example where a cultural weighting may be applied is when markets with a tendency to skepticism resulting in general lower opinions about corporations are compared with markets with an optimism tendency resulting in elevated opinions about corporations. In such cases, the cultural weighting removes cultural biases in rating and assures a standardized representation of reputation perceptions across different markets. The standardized formula may include equations 2 and 3 herein.

$$ZScore = \frac{(\text{Rescaled Score} - \text{Country Mean})}{\text{Country Standard Deviation}} \quad \text{(Eq. 2)}$$

$$\text{Standardized Score} = (ZScore * \text{Global } Std.Dev.) + \text{Global Mean} \quad \text{(Eq. 3)}$$

In equation 2 the country mean is the unweighted average score in the region. Preferably, the country mean is calculated periodically (e.g. every three years) from historical data of raw scores on the respondent level in each country. In addition, the country standard deviation represents the variability of scores among the respondents. Preferably, the country standard deviation is calculated periodically (e.g. every three years) from historical data of raw scores on the respondent level in each country. Preferably, the country mean and country standard deviation should be recalculated for a market, or region, within a predefined time period, for example, but not limited to, every three years, as previously mentioned, although it need not be every three years. This will ensure a high level of accuracy in the determined reputation score of the present system and method.

One having ordinary skill in the art would appreciate that while an example of a "market" has been provided as being a geographical region, a different measurable grouping may be used and the present invention is not intended to be limited to markets only being geographical regions.

During data collection from the unique group it is also beneficial to hit demographically representative quotas. As an example, common demographic groups that are targeted to ensure a market demographic representative sample for surveying may include age and gender. Unfortunately, during data collection it is not always possible to hit target demographic quotas exactly. As an example, a target demographic quota may be sixty percent women and forty percent men, however, a resulting highly reliable demographically representative sample of a survey population that is sized to provide a ninety-five percent or greater confidence interval, from people who are familiar with the surveyed entity (i.e., unique group) may not comprise sixty percent women. In these cases, the reputation perception score module 130 applies a demographic weight to the data collected from the unique group, where the demographic weight is dependent upon the actual unique group itself, so as to ensure that the unique group results are representative of the population targeted (block 228). If the unique group is representative of the population targeted, then no demographic weight is applied.

In accordance with one exemplary embodiment of the invention, a Random Iterative Method (RIM) weighting algorithm may be used to demographically weigh, and therefore match, the returned sample of the unique group, which may have already been culturally weighted, to the demographics of the population to which the study is intended. The algorithm is repeatedly applied to the data until the demographic weight converges. It is noted that a RIM weighting method allows a more precise analysis than a proportional weighting approach, although either method may be used, as well as other weighting methods known to those having ordinary skill in the art.

In accordance with an alternative embodiment of the invention, it should be noted that other weighting of data may be performed to account for other biases, such as, but not limited to, a data sources weighing. This would be beneficial when it is known that a specific data source tends to have a more positively biased or negatively biased audience that is used for surveying. Data source weighting takes this into account and applies a weight based on the source so as to normalize results.

The results after the weighting steps (blocks 226 and 228) are X number of rescaled, from zero to one hundred, emotional connection survey question returned ratings that have been weighted for cultural bias and demographic bias, for each of the categories of esteem reputation perception scores, admiration reputation perception scores, trust reputation perception scores, and feeling reputation perception scores, where X is the number of individuals within the unique group. These results are then aggregated within each category to provide a single aggregated reputation perception score within each of the four categories and a single final reputation perception score is derived from averaging these four (4) scores (block 230). It should be noted that additional or fewer categories may be implemented.

The resulting single final reputation perception score is then categorized into a normative scale, preferably of five categories (block 232), although less or more categories may be used. It is found that the use of five categories is ideal. For example, the five categories may be weak reputation, poor reputation, average reputation, strong reputation, and excellent reputation. Specific ranges of values between the zero to one hundred range for the reputation perception score may be assigned to each of the five categories, for example based on quantiles of a normal distribution, so that the received reputation perception score for an associated entity may have deeper meaning.

The present system and method provide for a great level of granularity of data, in addition to providing the overall single final aggregated reputation perception score, the reputation perception scores within each of the four categories, and the categorization of the single final aggregated reputation perception score into a normative scale. Specifically, it is recalled that the X number of original emotional connection survey question ratings are saved, the X number of rescaled emotional connection survey question ratings are saved, the X number of rescaled emotional connection survey question ratings that have been weighted for cultural and demographic bias for each of the four categories have been saved, the single aggregated reputation perception score within each of the four categories have been saved, the resulting single final reputation perception score has been saved, and the normative scale associated with the single final aggregated reputation perception score has been saved. This level of granularity in the data is very beneficial to the entity for which reputation determination is desired.

Returning to FIG. 4, after the reputation perception score module 130 (FIG. 3) determines the reputation perception score, the reputation driver score module 140 (FIG. 3) determines reputation factor scores (block 240). While the reputation perception score is a measure of a level of emotional connection of the general public to be surveyed with the entity for which reputation is to be measured, the reputation factor score is a measure of what an individual practically thinks about the entity for which reputation is to be measured.

Figure 7:
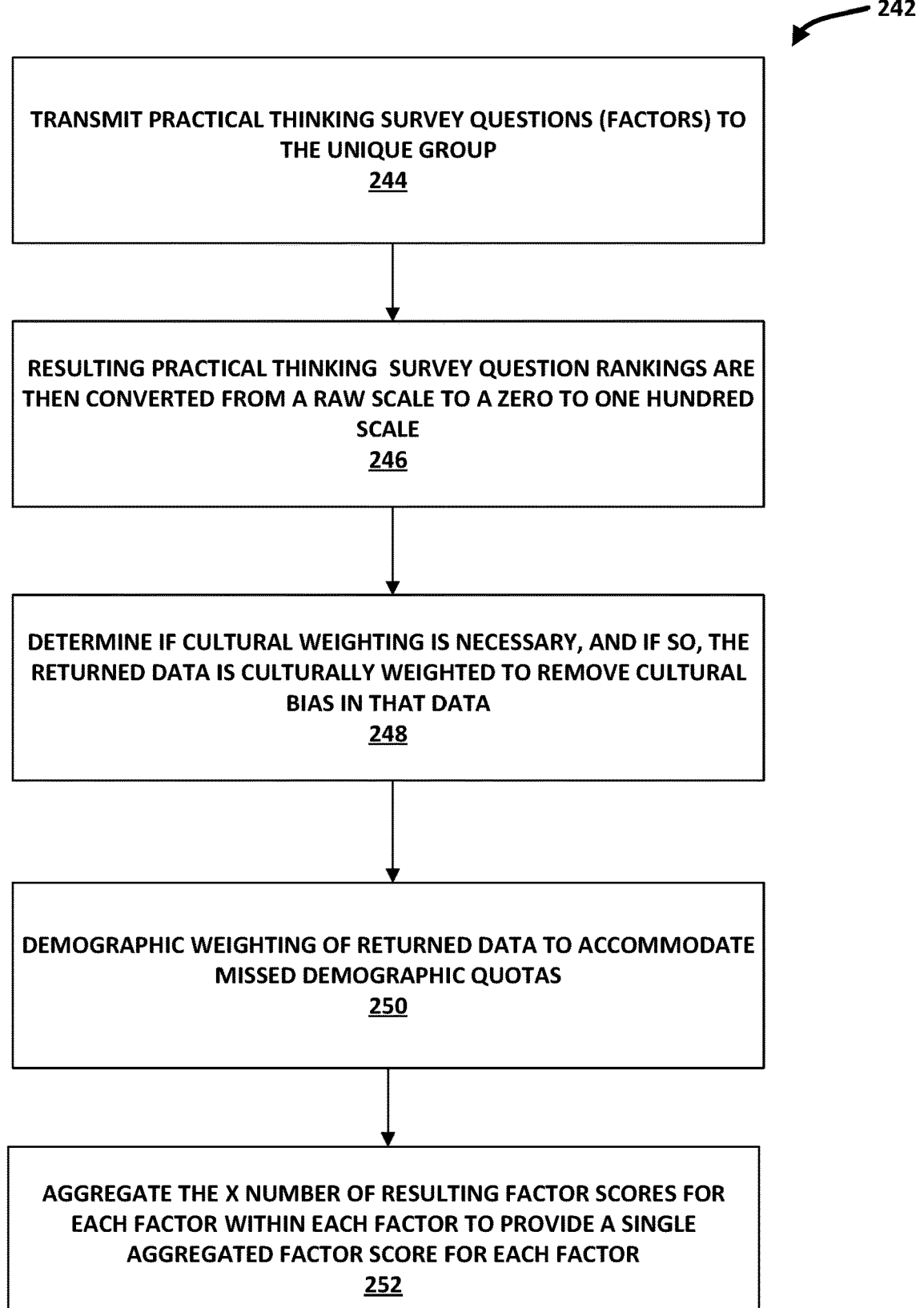
FIG. 7 is a flowchart illustrating steps taken in deriving the reputation factor score associated with the entity for which reputation is to be measured.

FIG. 7 is a flowchart 242 illustrating steps taken in deriving the reputation factor score associated with the entity for which reputation is to be measured. As shown by block 244, a second series of focused survey questions, this time being practical thinking survey questions, are transmitted to the unique group resulting from the data cleaning step. Each practical thinking survey question is also referred to as a factor. The transmitted practical thinking survey questions measure a level of practical thinking connection of the unique group with the company for which reputation is being measured. This may also be considered as the rational connection or the opinion of the respondent on each of the topics of the operations of the entity. It is to be recalled that the unique group is the result of the data cleaning step, so that practical thinking survey answers from the unique group are extremely similar to what would be returned by an entire desired population. More specifically, if a unique group is two thousand individuals, survey results from that unique group would be extremely similar, if not the same as that which would have been received if an entire population of one million people for which the survey was intended, were in fact surveyed.

Preferably there are more than twenty survey questions with the second set of focused survey questions. It is noted, however, that there may be more or fewer such survey questions within the set of practical thinking survey questions, depending upon a level of granularity needed to address aspects of drivers desired.

In accordance with the present invention, the second set practical thinking survey questions transmitted fall into one of seven categories. These categories are referred to herein as reputation drivers. Specifically, it was found that there are typically seven areas that people tend to care about when assessing the reputation of an entity. Those areas are referred to herein as reputation drivers, and include, for example, products and services, innovation, workplace, governance, citizenship, leadership, and performance.

The first reputation driver is Products & Services, which provides a perception of the general public on the quality and value of the entity's offerings and customer care. As an example, the survey question may ask a surveyed individual to rate from one to seven whether the entity offers high quality products and services, with a seven rating representing strong agreement, and a one rating representing strong disagreement felt by the surveyed individual.

The second reputation driver is Innovation, which addresses the perception of the company being innovative in its offerings, first to market and adaptable to change. As an example, the survey question may ask a surveyed individual to rate from one to seven whether the entity is an innovative company, with a seven rating representing strong agreement that the entity is an innovative company, and a one rating representing strong disagreement felt by the surveyed individual.

The third reputation driver is Workplace, which addresses the wellbeing of employees, Diversity, Equity and Inclusion, and workplace satisfaction. As an example, the survey question may ask a surveyed individual to rate from one to seven whether the entity offers equal opportunity in the workplace, with a seven rating representing strong agreement that the entity does offer equal opportunity in the workplace, and a one rating representing strong disagreement felt by the surveyed individual.

The fourth reputation driver is Governance, which addresses ethics, transparency and corporate responsibility. As an example, the survey question may ask a surveyed individual to rate from one to seven whether the entity is fair in the way it does business, with a seven rating representing strong agreement that the entity is fair in the way it does business, and a one rating representing strong disagreement felt by the surveyed individual.

The fifth reputation driver is Citizenship, which addresses the company's contribution to making the world better by supporting good causes and contributing to the community. As an example, the survey question may ask a surveyed individual to rate from one to seven whether the entity supports good causes, with a seven rating representing strong agreement that the entity does support good causes, and a one rating representing strong disagreement felt by the surveyed individual.

The sixth reputation driver is Leadership, which represents perceptions on entity's leadership and clear direction. As an example, the survey question may ask a surveyed individual to rate from one to seven whether the entity has excellent managers, with a seven rating representing strong agreement that the entity does have excellent managers, and a one rating representing strong disagreement felt by the surveyed individual.

The seventh reputation driver is Performance, which addresses the financial performance of an entity and future growth prospects. As an example, the survey question may ask a surveyed individual to rate from one to seven whether the entity is a profitable company, with a seven rating representing strong agreement that the entity is a profitable company, and a one rating representing strong disagreement felt by the surveyed individual.

While it is preferred that the answered rating for each practical thinking survey question be between one and seven, one having ordinary skill in the art would appreciate that a different scale may be used that is smaller than a zero to one-hundred scale. This will be apparent in the following description since a conversion is performed to change from a smaller scale to a zero to one-hundred scale, as described herein.

The result of this step is X number of returned responses for each practical thinking survey question or factor, where X is the number of individuals within the unique group. Therefore, if there are two-thousand individuals within the unique group (the highly reliable demographically representative sample of a survey population that is sized to provide a ninety-five percent or greater confidence interval, from people who are familiar with the surveyed entity), then assuming that all who received the practical thinking survey questions responded with ratings, there will be two-thousand responses for each practical thinking survey question, also referred to herein as the resulting practical thinking survey question rating. The resulting practical thinking survey question ratings may be stored within the reputation server 100 storage device 104, or within one of the other databases 30a, 30b, 30c within the network 1.

As shown by block 246, each of the resulting practical thinking survey question ratings returned are then converted by the reputation engine 108 from a raw scale of one to seven, to a zero to one hundred scale, to provide a rescaled score for each of the resulting practical thinking survey question rating returned. This process may be performed by using an equation such as, but not limited to, the previously mentioned equation 1.

The result of this step is X number of factor scores for each practical thinking survey question, where X is the number of individuals within the unique group. Each of the factor scores may then be stored within the reputation server 100 storage device 104, or within one of the other databases 30a, 30b, 30c within the network 1.

To ensure high accuracy in the final determined reputation of the reputation server 100, the present system and method overcomes "cultural bias" in the data by standardizing all factor scores against the aggregate distribution of all factor scores stored (block 248). A standardization formula is applied in each market to ensure that factor scores are comparable across different markets, where different weights are applied to specific data based on the specific market. As previously mentioned, it should be noted that a "market" may be considered a specific geographical region, for example, a country, or a smaller geographical region. The standardization formula takes into account a country mean and a country standard deviation to normalize that which may have been skewed merely as a product of cultural pride or bias in general. The standardized formula may include the previously mentioned equations 2 and 3. Preferably, the country mean and country standard deviation should be recalculated for a market, or region, within a predefined time period, for example, but not limited to, every three years. This will ensure a high level of accuracy in the determined factor score of the present system and method.

As previously mentioned, during data collection from the unique group it is also beneficial to hit demographically representative quotas. As an example, common demographic groups that are targeted to ensure a market demographic representative sample for surveying may include age and gender. Unfortunately, during data collection it is not always possible to hit target demographic quotas exactly. As an example, a target demographic quota may be sixty percent women and forty percent men, however, a resulting highly reliable demographically representative sample of a survey population that is sized to provide a ninety-five percent or greater confidence interval, from people who are familiar with the surveyed entity (i.e., unique group) may not comprise sixty percent women. In these cases, the reputation driver score module 140 applies a demographic weight to the data collected from the unique group, where the demographic weight is dependent upon the actual unique group itself, so as to ensure that the unique group results are representative of the population targeted (block 250). If the unique group is representative of the population targeted, then no demographic weight is applied.

Also as previously mentioned, in accordance with one exemplary embodiment of the invention, a RIM weighting algorithm may be used to demographically weigh, and therefore match, the returned sample of the unique group, which may have already been culturally weighted, to the demographics of the population to which the study is intended. The algorithm is repeatedly applied to the data until the demographic weight converges. It is noted that a RIM weighting method allows a more precise analysis than a proportional weighting approach, although either method may be used, as well as other weighting methods known to those having ordinary skill in the art.

In accordance with an alternative embodiment of the invention, it should be noted that other weighting of data may be performed to account for other biases, such as, but not limited to, a data sources weighing. This would be beneficial when it is known that a specific data source tends to have a more positively biased or negatively biased audience that is used for surveying. Data source weighting takes this into account and applies a weight based on the source so as to normalize results.

The results after the weighting steps (blocks 248 and 250) are X number of rescaled, from zero to one hundred, practical thinking survey question returned ratings that have been weighted for cultural bias and demographic bias, for each of the factors, where X is the number of individuals within the unique group. These results are also referred to herein as weighted factor scores. The X number of resulting weighted factor scores for each factor are then aggregated within each factor to provide a single aggregated factor score for each factor (block 252). The result is one resulting reputation factor score for each factor.

Figure 8:
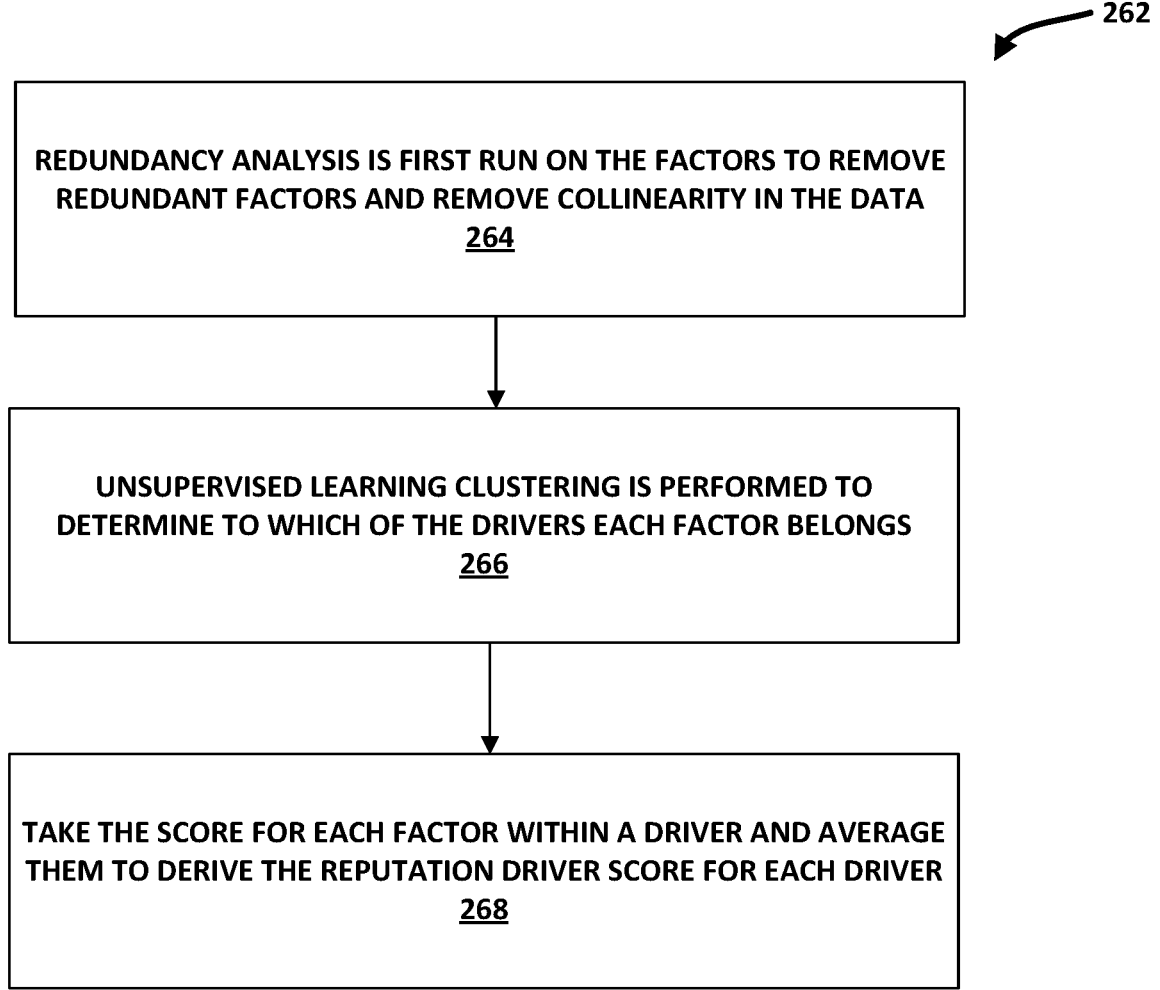
FIG. 8 is a flowchart illustrating steps taken in determining reputation driver scores.

Returning to FIG. 4, after determining the resulting reputation factor scores the reputation driver score module 140 (FIG. 3) determines reputation driver scores (block 260). FIG. 8 is a flowchart 262 illustrating steps taken in determining reputation driver scores.

Referring to FIG. 8, as shown by block 264, redundancy analysis is first run on the resulting reputation factor scores to remove redundant factors and remove collinearity in the data. Specifically, it may be the case that in answering the practical thinking survey questions, surveyed parties may consider two or more of the practical thinking survey questions to be the same. As one having ordinary skill in the art would appreciate, this could skew resulting data, and therefore, make the resulting derived reputation and guidance regarding reputation of the entity less accurate. It is also noted that it may simply be desirable to decrease the number of survey questions asked. Knowing that there is redundancy in projected response would allow for removal of one or more questions. Therefore, such redundant factors should be removed, as well as associated collinearity in the data. To do so, the redundancy analysis (RDA) is run on the factor scores. As part of this process the factors are projected onto linearly independent unique components. This may result in less factors than originally used. A redundancy analysis may be considered as an extension of the multiple linear regression method (MLR) that accounts for multiple response/multiple explanatory input variables and is considered a common method in multivariate statistics. RDA may be performed, for example, by a dimensionality reduction method such as correspondence analysis (CA), discriminant analysis (DA), a canonical version of the principal component analysis (PCA), or non-metric multidimensional scaling (NMDS). Since one having ordinary skill in the art would know how to perform redundancy analysis (RDA), further description is not provided herein.

Unsupervised learning clustering is then used by the reputation driver score module 140 (FIG. 3) to determine to which of the drivers each factor belongs, thereby dividing each of the remaining factors after the redundancy analysis step into one of the drivers (block 266). The process of clustering the reputation factors with unsupervised machine learning into the reputation drivers may be performed by using, for example, principal component analysis (PCA), where the number of components is the number of drivers (7) and the result is the number of factors per each of the drivers (7). PCA is just an example of an unsupervised learning clustering method that may be used in such an implementation, but not limited to, and other clustering methods such as hierarchical clustering, K-Means, or other, may also be used. The result of the unsupervised learning clustering is the number of remaining factors broken into each one of the drivers, therefore, each driver will have a series of factors assigned thereto. For example, if there were twenty factors and seven drivers, the twenty factors are broken into the seven drivers so that each factor is uniquely assigned to a driver, resulting in, for example, a first driver having three factors, a second driver having two factors, a third driver having four factors, and so on.

To determine reputation driver scores the reputation driver score module 140 (FIG. 3) takes the scores of factors assigned to a single driver and averages them to result in a reputation driver score for that driver (block 268). As an example, if a first driver contains factors two, five, and seven, and the factor two score is seventy, the factor five score is eighty, and the factor seven score is ninety, the first reputation driver score is eighty. This process is repeated for all drivers to derive reputation driver scores. The clustering of the factors into drivers may be applied periodically, for example but not limited to once a year, to determine the optimal number of factors per each of the seven drivers. The resulting model structure of the reputation drivers, with certain factors assigned to each of the seven drivers, may be saved and used for calculation of driver scores from factor scores in the interim shorter time periods, for example monthly, or weekly.

As a result of this step, the reputation server 100 now contains the previously determined reputation score, the multiple resulting factor scores, and the reputation driver scores. Returning to FIG. 4, a relationship is sought between these three main bodies of data so as to determine a driver weight and a driver order of importance which will be beneficial to the entity seeking the reputation score (block 280). Specifically, an entity seeking a determination of their reputation is seeking to be able to manage their reputation and have as high a reputation as possible. The present system and method determines weights for each of the reputation drivers and order of importance to maximizing reputation of the entity.

To determine the driver weights, the driver score module 140 uses a supervised machine learning regression module, such as, but not limited to, linear regression, multivariate linear regression, random forest, or gradient boosting, to predict the reputation score from the driver scores, where for the dependent variable, which is the variable we are seeking to predict, the reputation score is used, and for the input variable the driver scores are used. The result is the weight for each of the drivers, which allows for determining importance based on values of the weights. Specifically, a lower determined weight for a driver demonstrates that the specific driver is less important to the overall reputation of the entity. This allows the entity to determine which drivers are most important to increasing reputation of the entity. For ease of use, the resulting driver weights may be normalized so that each weight is a specific percentage of a total of one hundred. For example, out of seven weights, a first weight may be five percent, a second weight twenty percent, a third weight ten percent, a fourth weight thirty percent, a fifth weight five percent, and sixth weight eight percent, and a seventh weight twenty two percent. This would demonstrate that the fourth weight is the most important to the overall reputation of the entity, and therefore, the most value would be gained by the entity with investing time and effort into the fourth weight.

A similar weighting process as described above may be performed for weighting the reputation factors within each driver to derive for the entity a more granular level of insights on their reputation management.

A resulting report for an entity seeking its determined reputation and seeking to manage its reputation could include, per period of time, its overall reputation score and a list of the drivers and associated importance weights so as to provide guidance on which areas to invest additional time and money for maximum increase in reputation. Additional data may also be provided, such as, but not limited to, the factors scores and weights, benchmarking to competitors, industry classification, benchmarking to industry, touch-points between the stakeholder and the entity, media data and scores, ESG (environmental, social, and governance) perception scores, and various business outcomes scores (also referred to herein as behavioral connection scores). This data and the trend lines, benchmarking analysis, machine learning results, and reputation management insight and guidance related to reputation management may be delivered to the entity via a digital platform, via one or more means, such as, but not limited to, Power point, excel files, and one or more of many other means.

The memory 106 also contains a behavioral connection module 150. The behavioral connection module 150 is used to determine behavioral connection scores. Behavioral connection scores are a measure of the likelihood that the targeted population will perform a positive action on behalf of an entity.

FIG. 9 is a flowchart 300 illustrating steps taken in deriving the behavioral connection score associated with the entity for which reputation is to be measured. As shown by block 302, a third series of focused survey questions, this time being behavioral connection survey questions, are transmitted to the unique group resulting from the data cleaning step. One having ordinary skill in the art would appreciate that transmitting the survey questions may be performed by one or more of many different techniques, such as, but not limited to, having the respondent log into a website, sending materials to review and response, or any other way that a survey may be provided. Of course, as previously mentioned, there may be unique groups for each targeted population group. As non-limiting examples, there may be a general public in the United States unique group, a pet-owners in Europe unique group, and an IT decision makers unique group. In addition, when all of the scores related to reputation management such as reputation scores, factor scores, driver scores, behavioral connection scores, and all other reputation management scores are updated, the members of the unique group may vary from those surveyed in the previous period. Further, each time the set of scores are calculated, the scores are saved to the database in association with a time period, per entity, so as to allow for determining trends, building machine learning models, and to help the entity manage their reputation over time.

The transmitted behavioral connection survey questions measure the likelihood that a member of the unique group will perform a positive action on behalf of the entity for which reputation is being measured. This may also be considered as the Business Outcomes of Reputation Management. Non-limiting examples of survey questions focused on determining a measure of the likelihood that the public will perform a positive action on behalf of an entity include questions asking how likely is it that the surveyed individual would recommend the entity, how likely it is that the surveyed individual would work for the entity, how likely it is that the surveyed individual would buy from the entity, how likely it is that the surveyed individual would invest in the entity, and more.

It is to be recalled that the unique group is the result of the data cleaning step, so that behavioral connection survey answers from the unique group are extremely similar (within a 95% confidence interval) to what would be returned by an entire desired population. More specifically, if for example a unique group is two thousand individuals, survey results from that unique group would be extremely similar (within 95% confidence interval), if not the same (with only a 5% margin of error) as that which would have been received if an entire population of more than one million people for which the survey was intended, were in fact surveyed.

While a specific number of behavioral connection survey questions is not required, it is preferred that there be about ten of such behavioral connection questions, each representing a particular desired business outcome, for example, 11 survey questions within the third set of focused survey questions. It is noted, however, that there may be more or fewer such survey questions within the set of behavioral connection survey questions, depending upon a level of granularity needed.

It is preferred that the answered ratings for each behavioral connection survey question be between one and seven, although one having ordinary skill in the art would appreciate that a different scale may be used that is smaller than a zero to one-hundred scale. This will be apparent in the following description since a conversion is performed to change from a smaller scale to a zero to one-hundred scale, as described herein.

The result of this step is X number of returned responses for each behavioral connection survey question or factor, where X is the number of individuals within the unique group. Therefore, if there are two-thousand individuals within the unique group (the highly reliable demographically representative sample of a survey population that is sized to provide a ninety-five percent or greater confidence interval, from people who are familiar with the surveyed entity), then assuming that all who received the behavioral connection survey questions responded with ratings, there will be two-thousand responses for each behavioral connection survey question, also referred to herein as the resulting behavioral connection survey question ratings. The resulting behavioral connection survey question ratings may be stored within the reputation server 100 storage device 104, or within one of the other databases 30*a*, 30*b*, 30*c* within the network 1.

As shown by block 304, each of the resulting behavioral connection survey question ratings returned are then converted by the reputation engine 108 from a raw scale of one to seven, to a zero to one hundred scale, to provide a rescaled score for each resulting behavioral connection survey question rating returned. This process may be performed by using an equation such as, but not limited to, the previously mentioned equation 1.

The result of this step is X number of behavioral connection scores for each behavioral connection survey question, where X is the number of individuals within the unique group. Each of the behavioral connection scores may then be stored within the reputation server 100 storage device 104, or within one of the other databases 30*a*, 30*b*, 30*c* within the network 1.

To ensure high accuracy in the final determined reputation of the reputation server 100, the present system and method overcomes "cultural bias" in the data by standardizing all behavioral connection scores against the aggregate distribution of all behavioral connection scores stored (block 306). A standardization formula is applied in each market to ensure that behavioral connection scores are comparable across different markets, where different weights are applied to specific data based on the specific market. As previously mentioned, it should be noted that a "market" may be considered a specific geographical region, for example, a country, or a smaller geographical region. The standardization formula takes into account a country mean and a country standard deviation to normalize that which may have been skewed merely as a product of cultural pride or bias in general. The standardized formula may include the previously mentioned equations 2 and 3.

Preferably, the country mean and country standard deviation should be recalculated for a market, or region, within a predefined time period, for example, but not limited to, every three years. This will ensure a high level of accuracy in the determined behavioral connection score of the present system and method.

As previously mentioned, during data collection from the unique group it is also beneficial to hit demographically representative quotas. As an example, common demographic groups that are targeted to ensure a market demographic representative sample for surveying may include age and gender. Unfortunately, during data collection it is not always possible to hit target demographic quotas exactly. As an example, a target demographic quota may be sixty percent women and forty percent men, however, a resulting highly reliable demographically representative sample of a survey population that is sized to provide a ninety-five percent or greater confidence interval, from people who are familiar with the surveyed entity (i.e., unique group) may not comprise sixty percent women. In these cases, the behavioral connection score module 150 applies a demographic weight to the data collected from the unique group, where the demographic weight is dependent upon the actual unique group itself, so as to ensure that the unique group results are representative of the population targeted (block 308). If the unique group is representative of the population targeted, then no demographic weight is applied.

Also as previously mentioned, in accordance with one exemplary embodiment of the invention, a RIM weighting algorithm may be used to demographically weigh, and therefore match, the returned sample of the unique group, which may have already been culturally weighted, to the demographics of the population to which the study is intended. The algorithm is repeatedly applied to the data until the demographic weight converges. It is noted that a RIM weighting method allows a more precise analysis than a proportional weighting approach, although either method may be used, as well as other weighting methods known to those having ordinary skill in the art.

In accordance with an alternative embodiment of the invention, it should be noted that other weighting of data may be performed to account for other biases, such as, but not limited to, a data sources weighing. This would be beneficial when it is known that a specific data source tends to have a more positively biased or negatively biased audience that is used for surveying. Data source weighting takes this into account and applies a weight based on the source so as to normalize results.

The results after the weighting steps are X number of rescaled, from zero to one hundred, behavioral connection survey question returned ratings that have been weighted for cultural bias and demographic bias, for each of the questions, where X is the number of individuals within the unique group. These results are also referred to herein as weighted behavioral connection scores. The X number of resulting weighted behavioral connection scores for each question are then aggregated within each individual question to provide a single aggregated behavioral connection score for each behavioral connection survey question (block 310). The result is one resulting behavioral connection score for each behavioral connection survey question. For example, if there are ten (10) behavioral connection survey questions, the result after the previously mentioned steps is one aggregate resulting behavioral connection score for each of the ten behavioral connection survey questions.

A resulting report for an entity seeking its determined reputation and seeking to manage its reputation could include, per period of time, its aggregate resulting behavioral connection score so as to provide guidance on which areas to invest additional time and money for maximum increase in reputation.

At this point, resulting data includes reputation scores, driver scores per driver, factor scores per factor, and behavioral connection (also called business outcome) scores per behavioral connection question, as well as the overall reputation score and a list of the drivers and associated importance weights (prioritizing the importance of each driver for the entity's reputation). In accordance with the present invention, additional actionable insights may be presented to the entity seeking its reputation score. Specifically, for each behavioral connection score, the present system and method can prioritize the importance of drivers and/or factors for predicting each of the behavioral connections between the public and the entity for which reputation is sought (block 312). This allows the entity to be better able to determine what things, as identified by drivers and factors, to focus on in order to increase behavioral connection between the public represented by the unique group and the entity.

Prioritization of the importance of drivers for predicting each of the behavioral connections can be performed by using a supervised machined learning regression model, such as, but not limited to, linear regression, multivariate linear regression, random forest, or gradient boosting, to predict a known behavioral connection score from the driver scores, where the known behavioral connection score may be one previously derived as already described, or one received remotely or stored within the reputation server 100 storage device 104, or within one of the other databases 30a, 30b, 30c within the network 1. As a non-limiting example, in using a linear regression or a random forest regression, the behavioral connection question may be "are you likely to purchase a product from the entity", and the scores, for instance from a two-thousand scores from a unique group of two-thousand individuals, may be the scores derived for this behavioral connection question after calculations and weightings. Another example of implementation would be using aggregated scores of reputation perception and drivers as inputs per each dependent set of behavioral connection aggregated scores, for example, 12 or 24 for each entity. Ideally, for increased accuracy and for detecting evolution of weights over time, the regression model is used tens or even hundreds of times, to derive an unknown weight, or hyperparameter, for each driver. Based on the weight derived for each driver, or a perception score, all perception scores (including reputation score, reputation drivers scores, ESG scores, brand scores, etc.) that are predictors of a single behavioral connection are prioritized by numerically sorting the perception drivers and other aggregated perception scores by weight value, with the largest perception score weight representing the perception score that has the greatest effect on the behavioral connection score (also called business outcome score). The prioritized perception scores weights may then be normalized to a zero to one-hundred percent range. An example of a result may be for a first behavioral connection question a first driver weight of forty percent, a second driver weight of ten percent, a third driver weight of fifteen percent, a fourth driver weight of twelve percent, and so on. This demonstrates that the first perception score, for example the score of the reputation driver 'Products and Services' has the greatest effect on improving the first behavioral connection score. The prioritization of the most important drivers and other perception scores for each of the business outcomes provide information to the entity (company or industry) on areas to invest in, and which activities to prioritize, to increase a certain business outcome, or to target a certain population of stakeholders.

The process for prioritizing the importance of factors for predicting each of the behavioral connections can be performed in the same manner as the process used for prioritizing the importance of perception drivers, as previously mentioned, with supplementing the factors for the drivers. The result of this process is having prioritized drivers and prioritized factors that are important to predicting a specific behavioral connection. In accordance with the present system and method, the behavioral connection module 150 can then use supervised machine learning classification models to predict each of the behavioral connection scores from historical data, namely, the combination of already derived scores, including the reputation scores, factor scores, and driver scores, and possibly additional scores such as perception ESG (environmental, social, governance) scores, brand scores, etc. FIG. 10 is a flowchart 350 further illustrating steps taken by the behavioral connection module 150 in predicting the behavioral connection scores from the combinations of scores. Referring to block 352, a set of supervised machine learning models are trained using the historical data of previously determined driver scores, factor scores, reputation scores, and other perception scores used as input variables, for each behavioral connection business outcome score, which is the dependent variable. The trained models are then saved within the reputation server 100 (block 354). Each of the trained supervised learning models are then used to predict each of the business outcomes from an input set of perception scores. The input perception scores may include reputation scores, driver scores, factor scores, and other perception scores, based on the set of perception scores the model was trained with (block 356).

In implementation, for example, block 352 works by training of a single supervised machine learning model for a single behavioral connection question first using as the input variables the reputation scores, factor scores, and driver scores, and as output dependent variable a single behavioral connection score for a responding unique group, with or without a time lag, for example of one month. This process may be performed for one entity or multiple entities for a set of unique groups. As a second step of block 352, this same process is then performed for the same set of entities and the same set of responding unique groups, using the same input variables, but using a second of the behavioral connection scores, which is associated with a second behavioral connection score provided by that set of unique groups for one or multiple entities. As a third step of block 352, this process is performed for a set of unique groups per one or multiple entities, until a supervised machine learning model is trained for each of the behavioral connection scores, resulting in a set of supervised machines learning trained models, per each of the behavioral connection business outcomes. When training a supervised machine learning model per one entity, for one behavioral connection business outcome, the model training may be performed tens or even hundreds of times to increase the accuracy of the model by tuning the hyperparameters. The first, second, and third steps are then repeated for a second entity, and so on, until it has been performed for all sets of respondent groups, per entity, resulting in Y sets of supervised machine learning trained models, each per entity. Therefore, if there are for example, one hundred entities, the result would be one hundred sets of supervised machine learning trained models, each per entity. When training a supervised machine learning model per unique group, or per a set of unique groups, for multiple entities, the first, second, and third steps are then repeated for a second unique group, and so on, until it has been performed for all unique groups, resulting in Z sets of supervised machine learning trained models, each per a unique group. Similarly, therefore, if there are, for example, ten sets of unique groups, the result would be ten sets of supervised machine learning trained models, each per a unique group. Another example of implementation may be training one machine learning model, per at least one behavioral connection business outcome, using at least one unique group and at least one entity. As previously mentioned each of these machine learning models may be trained with or without a time lag, where a time lag may be, as a nonlimiting example, of one month. The trained models are then saved within the reputation server 100 (block 354). The trained models are then may be used to predict each of the behavioral connections from an input set of perception scores to help entities manage their reputation and business outcomes.

A non-limiting example of block 352 in FIG. 10 may include the following. For purposes of the example, we can assume that the behavioral connection question is "how likely is it that you will purchase a product from this entity?" Of course, this is only an example and many other behavioral connection questions may be used. It is also assumed that the unique group contains two-thousand individuals per year, resulting in the behavioral connection question being presented each month to a subset of the two-thousand individuals, or respondents, per multiple entities, for example three. For exemplary purposes, we can assume that there are seven drivers and twenty factors. Therefore, for each subset of the unique group, there are seven driver scores, twenty factor scores, and one reputation score, all of which, and additional perception scores, may be used as the input variables for the supervised machine learning model being trained. As the output variable, the business outcome scores for one business outcome question is used and the model is trained. As the second step of block 352, this same process is then performed for the same first responding unique group, using the same seven driver scores, twenty factor scores, and one reputation score as input variables, but using the second of the behavioral connection scores, which is associated with the second behavioral connection score provided by that unique group. As previously mentioned, this process is performed for the first unique group until the supervised machine learning model is trained for each of the behavioral connection scores, resulting in a set of supervised machine learning trained models per each behavioral connection business outcome score, for example 10.

Training of the models results in obtaining the relationship between the input variables and the output variables, also referred to as hyperparameters, or weights. Since the relationship between the input variables and output variables is known through having determined the hyperparameters, the present system and method can predict behavioral connection business outcome scores from newly received input variables associated with a new respondents' group who has responded to survey questions necessary to provide the seven driver scores, twenty factor scores, and one reputation score. Again, this is possible because the relationship between input variables and output variables is known, via the trained models, resulting in the hyperparameters, which can then be used when newly received input variables are provided, so as to predict resulting business outcome scores for the new respondent group associated with the newly received input variables, which are the scores calculated form all the respondents in the unique group in a time period, such as one month.

As a result of the abovementioned, after the supervised machine learning models are trained, the present system and method can predict business outcome scores for a new group of respondents as resulting from the input variables of the new respondents' group, including the driver scores, factor scores, and reputation score. This, in turn, decreases the number of survey questions that would need to be presented to a respondent, which decreases investment cost associated with surveys such as, but not limited to, fielding surveys focused on business outcomes, processing responses to the fielding, time associated with the fielding and processing, and more. As these machine learning models may be trained with a time lag, for example of one month, the behavioral connection business outcomes expected in a future time, for example next month, may be predicted from the input variables of reputation, drivers and factors, preparing the entity for expected stakeholder behaviors in the near future. The predicted behavioral connection value may be, but is not limited to, a score, a confidence interval, a range of scores, a quantile to which the score may belong, a bucket on a normative scale (for example, poor, weak, average, strong, or excellent), if the score is expected to be in the top 75% or below, or simply if the score is expected to go up or down next month as compared to the previous month.

At this point, resulting data includes, among other things, reputation scores and behavioral connection scores per business outcome (for example for 10 business outcomes), as well as the overall reputation score overtime trend and behavioral connections over time trends per each of the behavioral connection scores. With this information, correlations may be derived between the set of reputation scores over a period of time, for example 12 monthly scores, and each of the behavioral connection scores for the same period of time (for example, 12 monthly scores). In accordance with the present invention, additional actionable insights may be presented to the entity seeking its reputation score. Specifically, for each behavioral connection score, the present system and method can calculate the correlation, for example one may use the Pearson correlation, or Spearman correlation, between each of the behavioral connections set of scores over a period of time (for example 12 months) and between the reputation of the entity for which reputation is sought (block 312) over this period of 12 months. Calculating the correlation between the set of reputation scores over a period of time (for example 12 months) that were collected for a particular entity from a set of unique groups (for example 12) and a set of scores of a particular behavioral connection over the same period of time and the same set of unique groups would involve for example calculating the $R^2$ value, where a value of $R^2$ above a defined threshold (for example 0.8) would indicate a high correlation. As statistical methods of calculating the correlation between two set of numbers, or two trends, are known to those having ordinary skill in the art, we will not describe here further how a correlation may be derived. For purposes of the example, we can assume that the behavioral connection question is "how likely is it that you will purchase a product from this entity?" Of course, this is only an example and many other behavioral connection questions may be used. This allows the entity to better understand the correlation between its reputation over a set period of time (for example 12 months) and each of the business outcomes this entity is seeking. Thus, further understanding and being able to manage the influence of the reputation of the entity and the behavioral connection between the public represented by a certain unique group, or a set of unique groups, and the entity.

We claim:

1. A method for removing skew from data, removing collinearity in data, and reducing server processing in a server of a network, comprising the steps of:

removing, by the server, skew from data of previously determined factor scores by removing one or more redundant factors and collinearity in data of the previously determined factor scores by performing a redundancy analysis wherein the server projects a plurality of factors including the one or more redundant factors onto linearly independent unique components, resulting in one or more less factors than originally used, removing the one or more redundant factors;

based on the redundancy analysis, decreasing training of the one or more supervised learning models by removing one or more survey questions from a first survey to a previous group of one or more respondents, by the server, wherein at least some of the data of the previously determined factor scores is based on one or more answers to the one or more survey questions to be removed from the first survey, the first survey to the previous group having a number of survey questions;

based on the removing of the one or more redundant factors, reducing server processing to be performed by the server, wherein an unsupervised-machine-learning-based determining step comprises determining, by the server, which reputation driver within a set of reputation drivers each factor belongs by using unsupervised machine learning on data of the remaining factors after the redundancy analysis is performed, where a reputation driver is an area that members of the unique group would tend to care about when assessing the reputation of the entity, wherein the unsupervised-machine-learning-based determining assigns the remaining factors among the set of reputation drivers;

wherein a sample size of population is determined that is statistically representative of a desired survey population and which provides at least a pre-defined percent confidence interval, where those within the sample size have a predefined level of familiarity with the entity and are referred to herein as a unique group, wherein the server determines a measure of the likelihood that the targeted population will perform a positive action on behalf of an entity, referred to as a behavioral connection score, wherein the server determines the measure of the likelihood that the targeted population will perform a positive action on behalf of an entity comprises:

the server receives survey ratings from behavioral connection survey questions where each survey rating is provided by a party within the unique group;

the server weights the received survey ratings to accommodate for at least one of the group consisting of cultural bias and missed demographic quotas;

the server aggregates the weighted received ratings within each individual question to provide a single aggregated behavioral connection score for each behavioral connection survey question, wherein the predicted measure of likelihood that the targeted population will perform the positive action towards the entity, referred to as the behavioral connection score, is to be presented by a user interface of a user device that interacts with the server in the network.

2. The method of claim 1, wherein the received rating is converted from a raw scale to a different numerical scale.

3. The method of claim 1, wherein removed from the sample size are those not likely to provide true responses to survey questions.

4. The method of claim 1, wherein when the server weights the received survey ratings to accommodate for at least one of the group consisting of cultural bias and missed demographic quotas, the server further applies a standardization formula in each market to ensure that behavioral connection scores are comparable across different markets, where different weights are applied to specific data based on the specific market.

5. The method of claim 1, wherein the pre-defined percentage confidence interval is ninety-five percent confidence interval.

6. The method of claim 1, wherein the entity seeking its reputation is provided with the single aggregated behavioral connection score for each behavioral connection survey question.

7. The method of claim 1, wherein the received rating is converted from a raw scale to a different normative scale.

8. The method of claim 4, where market is a country or a region.

9. The method of claim 1, where a set of reputation scores, driver scores, factor scores, and behavioral connection scores, is derived from a set of unique groups over pre-defined time intervals to create an overtime trend of scores per entity.

10. The method of claim 1, wherein correlations are derived between a set of reputation scores over a pre-defined time period and a set of scores of at least one behavioral connection business outcome.

11. The method of claim 1, wherein correlations are derived between at set of scores of at least one factor over a pre-defined time period and a set of scores of at least one behavioral connection business outcome, where a factor score is a level of how those within the unique group practically think about the entity for which reputation is to be measured.

12. The method of claim 1, wherein correlations are derived between at set of scores of at least one driver over a pre-defined time period and a set of scores of at least one behavioral connection business outcome, where a driver score is a score of an area that members of the unique group would tend to care about when assessing the reputation of the entity.

13. The method of claim 9, where the importance of a group of measured factor scores from a unique group are ranked in priority for determining reputation of the entity for which reputation is being measured.

14. The method of claim 9, where the importance of a group of measured driver scores from a unique group are ranked in priority for determining reputation of the entity for which reputation is being measured.

15. The method of claim 9, where the importance of a group of measured factor scores from a unique group are ranked in priority for determining at least one behavioral connection business outcome.

16. The method of claim 9, where the importance of a group of measured driver scores from a unique group are ranked in priority for determining at least one behavioral connection business outcome.

17. The method of claim 9, wherein the set of unique groups responded for the same entity over a period of time at set intervals.

\* \* \* \* \*